(12) United States Patent
Shiotani

(10) Patent No.: US 10,936,260 B2
(45) Date of Patent: Mar. 2, 2021

(54) PRINTER AND NON-TRANSITORY COMPUTER-READABLE RECORDING MEDIUM STORING COMPUTER-READABLE INSTRUCTIONS FOR TERMINAL DEVICE

(71) Applicant: Brother Kogyo Kabushiki Kaisha, Nagoya (JP)

(72) Inventor: Takeshi Shiotani, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/570,794

(22) Filed: Sep. 13, 2019

(65) Prior Publication Data

US 2020/0089446 A1 Mar. 19, 2020

(30) Foreign Application Priority Data

Sep. 14, 2018 (JP) .............................. JP2018-172568

(51) Int. Cl.
*H04N 1/00* (2006.01)
*G06F 3/12* (2006.01)

(52) U.S. Cl.
CPC .......... *G06F 3/1236* (2013.01); *G06F 3/1209* (2013.01); *G06F 3/1222* (2013.01); *G06F 3/1238* (2013.01); *G06F 3/1279* (2013.01); *G06F 3/1292* (2013.01)

(58) Field of Classification Search
CPC ...... G06F 3/1292; G06F 3/1279; G06F 3/201; G06F 3/1222; G06F 3/1209; G06F 3/1236; G06F 3/1238

USPC ....................................................... 358/1.14
See application file for complete search history.

(56) References Cited

U.S. PATENT DOCUMENTS

| 9,313,363 | B2 | 4/2016 | Maeda | |
|---|---|---|---|---|
| 2013/0260683 | A1 | 10/2013 | Suzuki et al. | |
| 2014/0218763 | A1* | 8/2014 | Takahashi | G06F 3/1288 358/1.15 |
| 2015/0002892 | A1 | 1/2015 | Maeda | |
| 2015/0304805 | A1 | 10/2015 | Suzuki et al. | |
| 2017/0208431 | A1 | 7/2017 | Suzuki et al. | |

(Continued)

FOREIGN PATENT DOCUMENTS

| JP | 2013-214804 A | 10/2013 |
|---|---|---|
| JP | 2015-011590 | 1/2015 |

OTHER PUBLICATIONS

Wi-Fi Alliance Technical Committee P2P Task Group, "Wi-Fi Peer-to Peer (P2P) Technical Specification", Version 1.1, pp. 1-159, 2010.

*Primary Examiner* — Saeid Ebrahimi Dehkordy
(74) *Attorney, Agent, or Firm* — Banner & Witcoff, Ltd.

(57) ABSTRACT

A printer may receive communication information from a server via a second type interface in a case where account information for logging in to the server is sent to the server, receive the print data from the server via the second type interface in a case where the print data is uploaded onto the server due to the terminal device using the communication information without sending the account information to the server after the communication information has been sent to the terminal device, and cause the print executing unit to print the target image represented by the print data in a case where the print data is received from the server.

17 Claims, 14 Drawing Sheets

(56) References Cited

U.S. PATENT DOCUMENTS

2019/0075442 A1    3/2019  Suzuki et al.
2019/0129671 A1*   5/2019  She ...................... G06F 3/1288

* cited by examiner

FIG. 8 (Print Process : Case C)

FIG. 11 (Print Process : Case D)

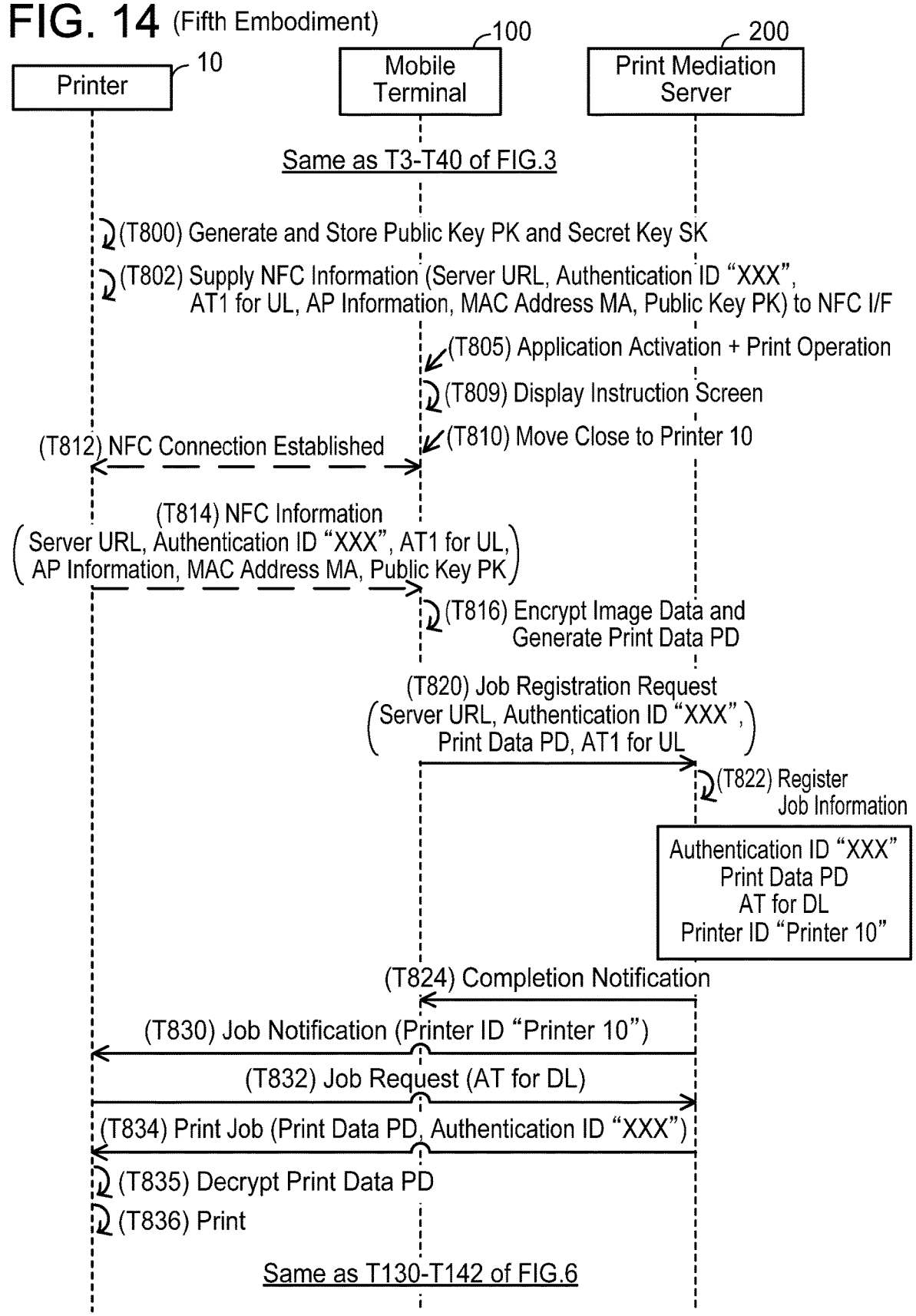

PRINTER AND NON-TRANSITORY COMPUTER-READABLE RECORDING MEDIUM STORING COMPUTER-READABLE INSTRUCTIONS FOR TERMINAL DEVICE

CROSS-REFERENCE TO RELATED APPLICATION

This application claims priority to Japanese Patent Application No. 2018-172568, filed on Sep. 14, 2018, the entire contents of which are hereby incorporated by reference into the present application.

TECHNICAL FIELD

The present specification discloses a technique for causing a printer to execute printing by using a terminal device.

BACKGROUND ART

A multi-function peripheral capable of executing data communication with a mobile terminal is known. In case of establishing an NFC (abbreviation of Near Field Communication) session with the mobile terminal, the multi-function peripheral shifts to G/O (abbreviation of Group Owner) state of the WFD (abbreviation of Wi-Fi Direct) scheme, sends a wireless setting to the mobile terminal by using the NFC session, and establishes a wireless connection with the mobile terminal in accordance with the WFD scheme. Thereby, since the multi-function peripheral can execute data communication with the mobile terminal by using the wireless connection, the multi-function peripheral can receive print data from the mobile terminal, and can execute printing according to the print data.

SUMMARY

The present specification discloses a technique in which, in a case where a first wireless connection is established between a printer and a terminal device, the printer is capable of executing printing of a target image represented by print data without establishing another wireless connection between the printer and the terminal device.

A printer disclosed herein may comprise a first type interface; a second type interface different from the first type interface; a print executing unit; a processor; and a memory storing computer-readable instructions therein, the computer-readable instructions, when executed by the processor, causing the printer to: in a case where account information for logging in to a server is sent to the server, receive communication information from the server via the second type interface, the communication information being for uploading print data onto the server, the print data representing a target image to be printed; supply the communication information to the first type interface in a case where the communication information is received from the server, wherein the communication information is sent to a terminal device by using a first wireless connection with the terminal device via the first type interface; receive the print data from the server via the second type interface in a case where the print data is uploaded onto the server due to the terminal device using the communication information without sending the account information to the server after the communication information has been sent to the terminal device; and cause the print executing unit to print the target image represented by the print data in a case where the print data is received from the server.

Further, a non-transitory computer-readable recording medium storing computer-readable instructions for a terminal device is herein disclosed. The computer-readable instructions, when executed by a processor of the terminal device, may cause the terminal device to: in a case where a first wireless connection with a printer via a first type interface of the terminal device is established, receive communication information from the printer via the first type interface by using the first wireless connection, the communication information being for uploading print data onto a server, the print data representing a target image to be printed; and in a case where the communication information is received from the printer, upload the print data onto the server by using the communication information without sending account information to the server, the account information being for logging in to the server, wherein in the server, the print data is sent to the printer in a case where the print data is received from the terminal device, and in the printer, printing of the target image represented by the print data is executed in a case where the print data is received from the server.

A control method for realizing the above printer, a computer program, and a computer-readable recording medium in which the computer program is stored are also novel and useful. A computer-readable recording medium for storing a computer program for the above terminal device, the terminal device itself, and a control method for realizing the terminal device are also novel and useful. Further, a communication system comprising the above printer and the above terminal device is also novel and useful.

BRIEF DESCRIPTION OF THE DRAWINGS

FIG. 14 shows a sequence diagram of a print process of a fifth embodiment.

EMBODIMENTS

Figure 1:
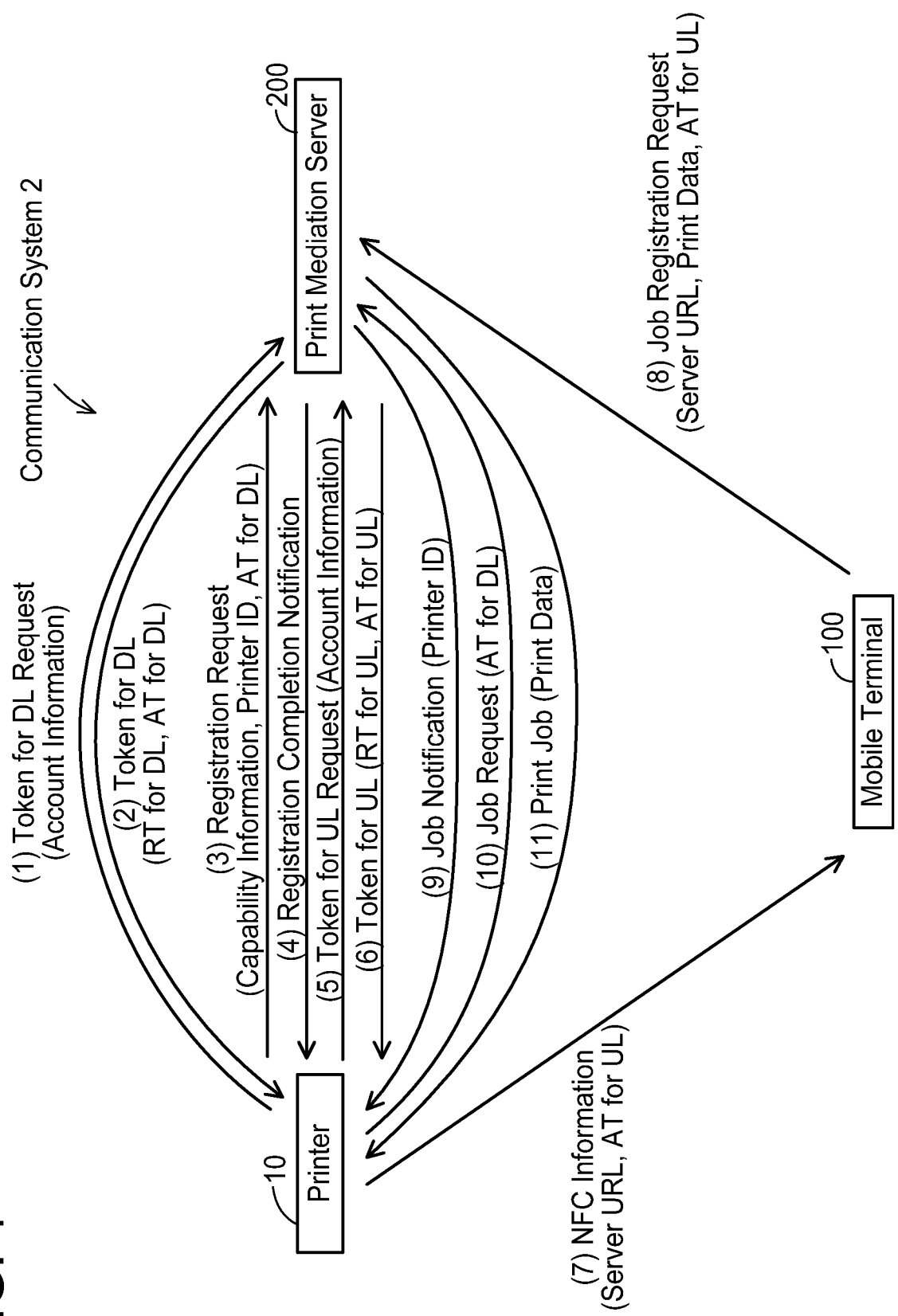
FIG. 1 shows an explanatory diagram for explaining an outline of an embodiment.

Outline of Embodiment; FIG. 1

First, an outline of the present embodiment will be described with reference to FIG. 1. A communication system 2 comprises a printer 10, a mobile terminal 100, and a print mediation server (referred to simply as "server" below) 200. In the present embodiment, it is accomplished that, in a situation where account information for a first user to log into the server 200 is registered in the server 200, even if account information of a second user different from the first user is not registered in the server 200, the second user causes the printer 10 to execute printing by using the mobile terminal 100. In order to realize such a mechanism, the printer 10 needs to be registered in the server 200. In order to register the printer 10 in the server 200, a registration process including the following processes (1) to (6) is executed.

The printer 10 accepts a registration operation from the first user for registering the printer 10 in the server 200. The registration operation includes an operation of inputting account information of the first user. The account information is information for logging the first user into the server 200, and has been registered in advance in the server 200 by the first user. In this case, (1) the printer 10 sends a token for downloading (referred to as "DL" below) request, that requests sending of a token for DL, to the server 200. The token for DL request includes the inputted account information.

(1) In case of receiving the token for DL request from the printer 10, the server 200 determines that account information included in the token for DL request has been registered (i.e., determines that authentication of the account information has succeeded), generates a refresh token for DL and an access token for DL, and registers the account information, the refresh token for DL, and the access token for DL in association with one another. The access token for DL is information for downloading print data from the server 200. The refresh token for DL is information for obtaining a new access token for DL from the server 200 after an expiration date for the access token for DL has elapsed. Moreover, below, a refresh token, an access token may be referred to as "RT", "AT", respectively. Next, the server 200 (2) sends the token for DL including the RT for DL and the AT for DL to the printer 10.

(2) In case of receiving the token for DL from the server 200, the printer 10 stores the token for DL, and (3) sends, to the server 200, a registration request for requesting registration of printer information of the printer 10. The registration request includes capability information of the printer 10, a printer ID for identifying the printer 10, and the stored AT for DL. The capability information is information indicating a plurality of print settings that the printer 10 is capable of using.

(3) In case of receiving the registration request from the printer 10, the server 200 determines that the AT for DL included in the registration request has been registered (i.e., determines that authentication of the AT for DL has succeeded), and registers the printer information. The printer information includes the account information, the RT for DL, the AT for DL, the capability information included in the registration request, and the printer ID included in the registration request. Then, (4) the server 200 sends a registration completion notification to the printer 10 indicating that registration of the printer information has been completed.

(4) In case of receiving the registration completion notification from the server 200, (5) the printer 10 sends, to the server 200, a token for uploading (referred to as "UL" below) request that requests sending of a token for UL. The token for UL request includes the account information of the first user.

(5) In case of receiving the token for UL request from the printer 10, the server 200 determines that the account information included in the token for UL request has been registered (i.e., determines that authentication of the account information has succeeded), generates an RT for UL and an AT for UL, and registers the RT for UL and the AT for UL in the printer information that includes the account information. Next, (6) the server 200 sends the token for UL including the RT for UL and the AT for UL to the printer 10.

(6) In case of receiving the token for UL from the server 200, the printer 10 stores the token for UL. Thereby, the registration process ends. Thereafter, a print process for causing the printer 10 to execute printing is executed.

The mobile terminal 100 accepts, from the second user, a print operation for causing the printer 10 to execute printing. The print operation includes an operation of selecting image data representing an image of a print target, and an operation of designating print setting(s) to be used by the printer 10. In this case, the mobile terminal 100 generates, from the selected image data, print data having a data format that the printer 10 can interpret, and displays an instruction screen instructing that the mobile terminal 100 is to be brought close to the printer 10. Thereby, the mobile terminal 100 is brought close to the printer 10 by the second user, and a wireless connection (referred to as "NFC connection" below) in accordance with the NFC (abbreviation of Near Field Communication) scheme is established between the printer 10 and the mobile terminal 100. As a result, the following processes (7) to (11) are executed.

(7) In the case where the NFC connection with the mobile terminal 100 is established, the printer 10 uses the NFC connection to send, to the mobile terminal 100, NFC information including a server URL (abbreviation of Uniform Resource Locator), and the AT for UL. The server URL is information indicating a location of the server 200.

(7) In case of receiving the NFC information from the printer 10, (8) the mobile terminal 100 sends, to the server 200, a job registration request for uploading print data to the server 200. The job registration request includes the server URL included in the NFC information, the generated print data, and the AT for UL included in the NFC information.

(8) In case of receiving the job registration request from the mobile terminal 100, the server 200 determines that the AT for UL included in the job registration request has been registered (i.e., determines that authentication of the AT for UL has succeeded), specifies the printer information including the AT for UL, and registers job information. The job information includes the print data included in the job registration request, the AT for DL included in the specified printer information, and the printer ID included in the specified printer information. Next, (9) the server 200 sends a job notification including the printer ID to the printer 10. The job notification is a notification indicating that the job information has been registered.

(9) In case of receiving the job notification from the server 200, (10) the printer 10 sends, to the server 200, a job request requesting sending of a print job. The job request includes the stored AT for DL.

(10) In case of receiving the job request from the printer 10, the server 200 specifies the job information including the AT for DL included in the job request (i.e., determines that authentication of the AT for DL has succeeded), and (11) sends, to the printer 10, the print job that includes the print data in the specified job information.

(11) In case of receiving the print job from the server 200, the printer 10 executes printing of the image represented by the print data included in the print job. Thereby, the print process ends.

Here, a configuration of a comparative example is assumed in which the process of (7) is not executed, i.e., a configuration of a comparative example in which the AT for UL is not sent from the printer 10 to the mobile terminal 100. In this case, the mobile terminal 100 must accept, from the second user, an input of the account information of the first user, send the token for UL request including the account information to the server 200 (see (5)), and receive the token for UL (see (6)) from the server 200. However, since the second user is different from the first user, there is a high likelihood that the second user does not know the account information of the first user. In this case, the mobile terminal 100 cannot send the token for UL request to the server 200, and consequently cannot send the job registration request including the AT for UL (see (8)) to the server 200. That is, according to the configuration of the comparative example, in a situation where the account information of the first user is registered in the server 200, it is difficult for the second user to use the mobile terminal 100 to cause the printer 10 to execute printing.

Further, if the second user registers the account information of the second user in the server 200, the mobile terminal 100 can accept the input of the account information of the second user from the second user, send the token for UL request including the account information to the server 200 (see (5)), and receive the token for UL from the server 200 (see (6)). However, it may be troublesome for the second user to further register the account information of the second user in the server 200. By contrast, in the present embodiment, the printer 10 sends the token for UL request to the server 200 (see (5)), receives the token for UL from the server 200 (see (6)), and sends the AT for UL to the mobile terminal 100 by using the NFC connection with the mobile terminal 100 (see (7)). Thereby, the mobile terminal 100 can send the job registration request including the AT for UL to the server 200 without accepting the input of the account information from the second user, i.e., without sending the token for UL request including the account information to the server 200 (see (8)). Thereby, in a situation where the account information of the first user has been registered in the server 200, the second user can cause the printer 10 to execute printing by using the mobile terminal 100 even without registering the account information of the second user in the server 200.

Figure 2:
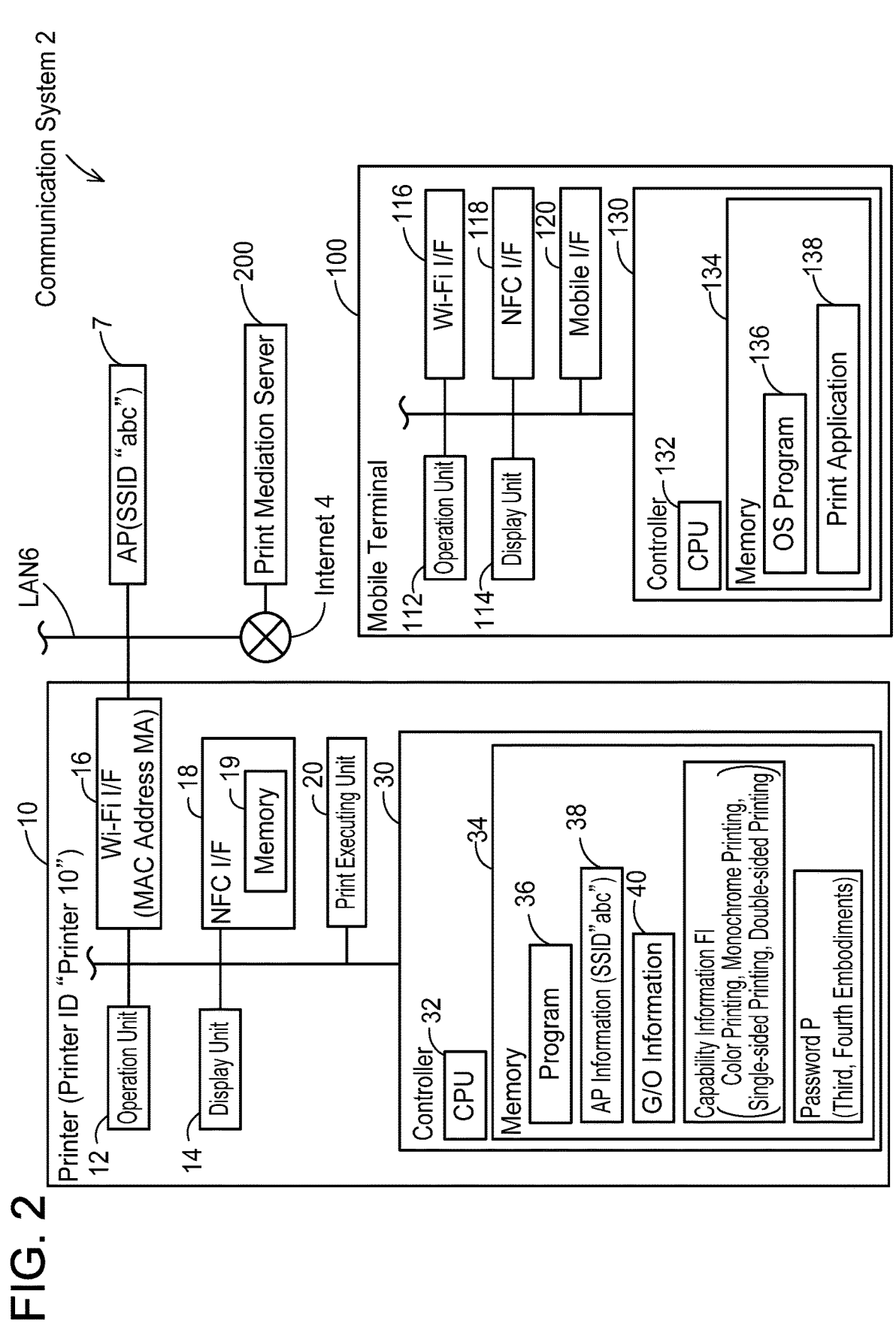
FIG. 2 shows a configuration of a communication system.

(Configuration of Communication System; FIG. 2)

Next, the configuration of the communication system 2 will be described with reference to FIG. 2. The communication system 2 comprises the printer 10, the mobile terminal 100, and the print mediation server (referred to simply as "server" below) 200. The printer 10 is connected with a LAN (abbreviation of Local Area Network) 6 formed by an AP (abbreviation of Access Point) 7. The LAN 6 is connected with the Internet 4. The server 200 is connected with the Internet 4. Consequently, the printer 10 is capable of communicating with the server 200 via the LAN 6 and the Internet 4.

(Configuration of Printer 10)

The printer 10 is a peripheral device (i.e., a peripheral device of the mobile terminal 100) capable of executing a print process. A printer ID "Printer 10" is allocated to the printer 10. The printer 10 comprises an operation unit 12, a display unit 14, a Wi-Fi interface 16, an NFC interface 18, a print executing unit 20, and a controller 30. The units 12 to 30 are connected to a bus line (reference number omitted). Below, interface is referred to as "I/F".

The operation unit 12 comprises a plurality of keys. A user can input various instructions to the printer 10 by operating the operation unit 12. The display unit 14 is a display for displaying various information. The print executing unit 20 comprises printing mechanisms such as an ink jet scheme, laser scheme, etc.

The Wi-Fi I/F 16 is a wireless interface for executing wireless communication according to the Wi-Fi scheme. A MAC address MA is allocated to the Wi-Fi I/F 16. The Wi-Fi scheme is a wireless communication scheme for executing wireless communication according to, for example, IEEE (abbreviation of The Institute of Electrical and Electronics Engineers, Inc.) standard 802.11 and standards conforming thereto (e.g., 802.11a, 11b, 11g, 11n, etc.). Further, the Wi-Fi I/F 16 supports the WFD (abbreviation of Wi-Fi Direct) scheme developed by the Wi-Fi Alliance, and is capable of executing wireless communication according to the WFD scheme. That is, the printer 10 is a WFD device. The WFD scheme is a wireless communication scheme described in the specification document "Wi-Fi Peer-to-Peer (P2P) Technical Specification Version 1.1" created by the Wi-Fi Alliance. In the WFD standard, three states are defined as states of a WFD device: Group Owner state (called "G/O state" below), Client state, and device state. The WFD device is capable of selectively operating in one of the above three states.

The NFC I/F 18 is an I/F for executing wireless communication according to the NFC scheme (referred to as "NFC communication" below). The NFC scheme is a wireless communication scheme based on an international standard, such as ISO/IEC14443, 15693, 18092, for example. Moreover, an I/F called NFC Forum Device, and an I/F called NFC forum tag are known as types of I/F for executing NFC communication. The NFC I/F 18 may be NFC Forum device, or may be NFC forum tag. The NFC I/F 18 comprises a memory 19 for storing NFC information.

Here, differences between Wi-Fi communication and NFC communication will be described. A communication speed of Wi-Fi communication (e.g., maximum communication speed is 11 to 600 Mbps) is faster than a communication speed of NFC communication (e.g., maximum communication speed is 100 to 424 Kbps). Further, a frequency of a carrier wave used for Wi-Fi communication (e.g. a 2.4 GHz band or 5.0 GHz band) is different from a frequency of a carrier wave used for NFC communication (e.g. a 13.56 MHz band). Further, a maximum distance at which Wi-Fi communication can be executed (e.g., approximately 100 m at maximum) is greater than a maximum distance at which NFC communication can be executed (e.g., approximately 10 cm at maximum).

The controller 30 comprises a CPU 32 and a memory 34. The CPU 32 executes various processes in accordance with a program 36 stored in the memory 34. The memory 34 is constituted of a volatile memory, a non-volatile memory, or the like. The memory 34 further stores AP information 38, G/O information 40, and capability information FI.

The AP information 38 shows information of an AP to which the printer 10 is currently connected. The AP information 38 includes an SSID (abbreviation of Service Set Identifier) "abc" identifying the wireless network formed by the AP 7.

The G/O information 40 shows information of the printer 10 which is operating in the G/O state. The G/O information 40 includes an SSID and password used in the wireless network in which the printer 10 operates as the G/O.

The capability information FI is information showing a plurality of print settings available to the printer 10. In the present embodiment, four print settings are available to the printer 10, these being a combination of two settings that are a number of print colors (i.e., color printing and monochrome printing), and two settings that are printing sides (i.e., single-sided printing and double-sided printing). Moreover, in a variant, the capability information FI may further include information such as a sheet size, etc. available to the printer 10.

(Configuration of Mobile Terminal 100)

The mobile terminal 100 is a portable terminal device such as a mobile phone (e.g., a smartphone), a PDA, a notebook PC, a tablet PC, etc. The mobile terminal 100 comprises an operation unit 112, a display unit 114, a Wi-Fi I/F 116, an NFC I/F 118, a mobile I/F 120, and a controller 130. The units 112 to 130 are connected to a bus line (reference number omitted). The units 112 to 118 are the same as the units 12 to 18 of the printer 10.

The mobile I/F 120 is an I/F for executing wireless communication (called "mobile communication" below) according to a cellular scheme (e.g., the 3G scheme, the 4G scheme, etc.). The mobile terminal 100 can access the Internet 4 via the mobile I/F 120. That is, the mobile terminal 100 is capable of communicating with the server 200 via the mobile I/F 120.

The controller 130 comprises a CPU 132 and a memory 134. The CPU 132 executes various processes in accordance with an OS program 136 stored in the memory 134. The memory 134 is constituted of a volatile memory, a non-volatile memory, or the like. The memory 134 further stores a print application (referred to simply as "app" below) 138. The app 138 is an application for causing the printer 10 to execute printing. The app 138 may be, for example, installed on the mobile terminal 100 from a server on the Internet provided by a vendor of the printer 10, or may be installed on the mobile terminal 100 from media shipped together with the printer 10.

(Configuration of Print Mediation Server 200)

The server 200 is a server placed on the Internet 4 and is, for example, a GCP (abbreviation of Google Cloud Print) server provided by Google (registered trademark). However, in a variant, the server 200 may be, for example, a server provided by the vendor of the printer 10. The server 200 is a server for executing mediation of printing between the printer 10 and the mobile terminal 100. That is, the server 200 receives a job registration request from the mobile terminal 100 (see (8) of FIG. 1), and sends print data included in the job registration request to the printer 10 (see (11) of FIG. 1).

Figure 3:
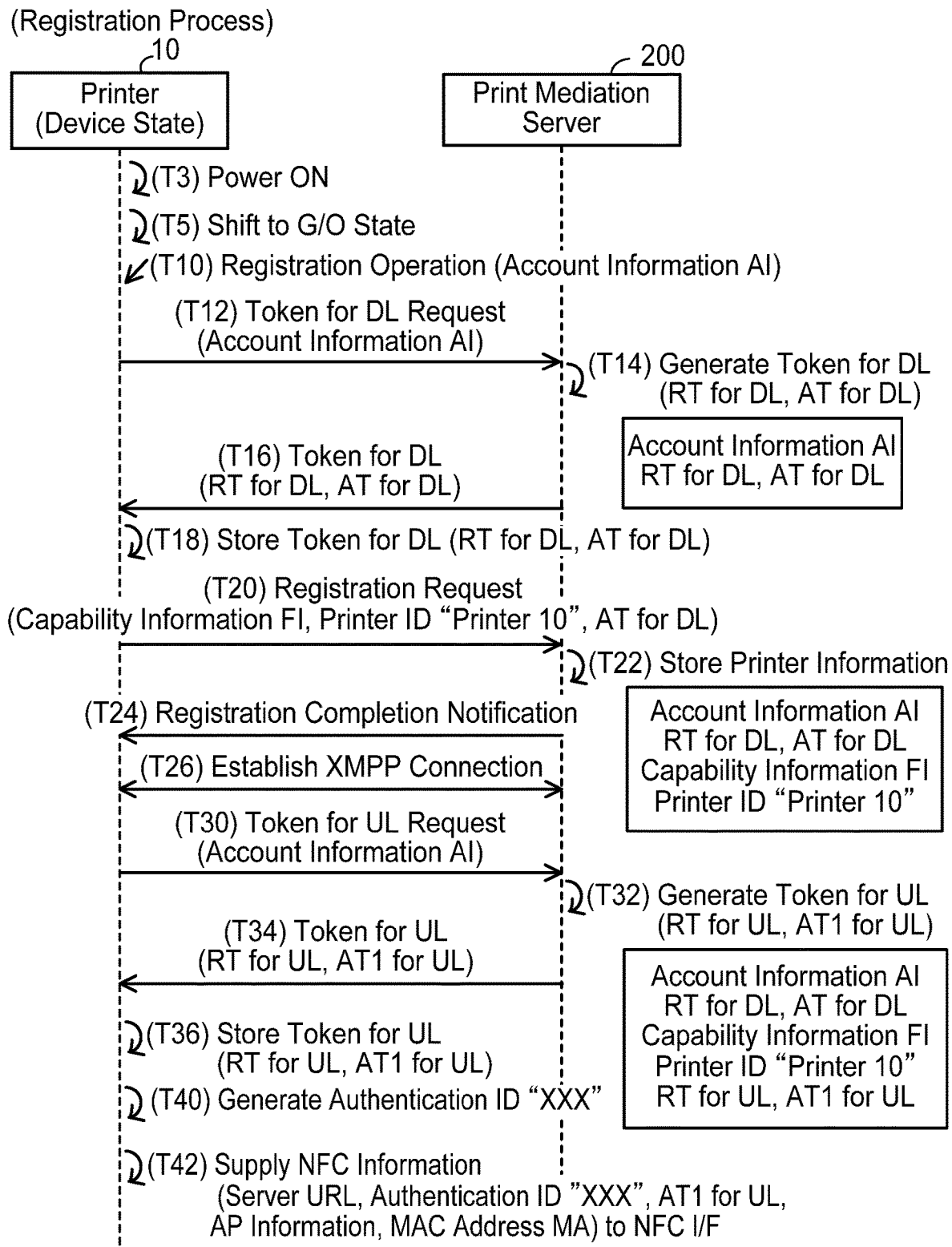
FIG. 3 shows a sequence diagram of a registration process.

(Registration Process; FIG. 3)

Next, the registration process (see (1) to (6) of FIG. 1) will be described with reference to FIG. 3. Below, to facilitate understanding, operations executed by the CPU of each device (e.g., the CPU 32 of the printer 10) are described with each device (e.g., the printer 10) as the subject, not with the CPU described as the subject. First, in response to accepting a power ON operation from the first user, the printer 10 turns the power on in T3, and shifts from the device state to the G/O state in T5.

In T10 the printer 10 accepts a registration operation including the input of the account information AI of the first user, and in T12 sends a token for DL request including the account information AI to the server 200 via the Wi-Fi I/F 16 ((1) of FIG. 1).

In case of receiving the token for DL request from the printer 10 in T12, the server 200 determines that the account information AI included in the token for DL request has been registered (i.e., determines that authentication of the account information AI has succeeded), and in T14 generates an RT for DL and an AT for DL, and registers the account information AI, the RT for DL, and the AT for DL in association with one another. Next, in T16 the server 200 sends a token for DL including the RT for DL and the AT for DL to the printer 10 ((2) of FIG. 1).

In case of receiving the token for DL from the server 200 via the Wi-Fi I/F 16 in T16, in T18 the printer 10 stores the token for DL in the memory 34, and in T20 sends a registration request to the server 200 via the Wi-Fi I/F 16 ((3) of FIG. 1). The registration request includes the capability information FI being stored in the memory 34, the printer ID "Printer 10", and the AT for DL being stored in the memory 34.

In case of receiving the registration request from the printer 10 in T20, the server 200 determines that the AT for DL included in the registration request has been registered (i.e., determines that authentication of the AT for DL has succeeded), and in T22 registers the printer information. The printer information includes the account information AI, the RT for DL, the AT for DL, the capability information FI included in the registration request, and the printer ID "Printer 10" included in the registration request. Next, in T24 the server 200 sends a registration completion notification to the printer 10 ((4) of FIG. 1).

In case of receiving the registration completion notification from the server 200 via the Wi-Fi I/F 16 in T24, in T26 the printer 10 establishes an XMMP (abbreviation of eXtensible Messaging and Presence Protocol) connection, which is a so-called constant connection, with the server 200. More specifically, the printer 10 sends a connection request including the AT for DL to the server 200 via the Wi-Fi I/F 16, and in case of receiving a response to the connection request from the server 200, establishes the XMMP connection with the server 200. When the XMMP connection is established in this manner, even if the server 200 does not receive a signal from the printer 10, the server 200 can use the XMMP connection to send a signal (e.g., the job notification of (9) of FIG. 1) to the printer 10 across a firewall of the LAN 6.

In T30, the printer 10 sends a token for UL request including the account information AI inputted in T10, to the server 200 via the Wi-Fi I/F 16 ((5) of FIG. 1).

In case of receiving the token for UL request from the printer 10 in T30, the server 200 determines that the account information AI included in the token for UL request has been registered (i.e., determines that authentication of the account information AI has succeeded), and in T32 generates an RT for UL and an AT for UL, and registers the RT for UL and the AT for UL in the printer information including the account information AI. The RT for UL is different from the RT for DL, and the AT for UL is different from the AT for DL. Moreover, the AT for UL registered here is referred to as "AT1 for UL" in order to distinguish it from a new AT for UL, which will appear later. Next, in T34 the server 200 sends a token for UL including the RT for UL and the AT1 for UL to the printer 10 ((6) of FIG. 1).

In case of receiving the token for UL from the server 200 via the Wi-Fi I/F 16 in T34, in T36 the printer 10 stores the token for UL in the memory 34.

Next, in T40 the printer 10 generates an authentication ID "XXX" having a random character string, and in T42 supplies the NFC information to the NFC I/F 18, and stores the NFC information in the memory 19 of the NFC I/F 18. The NFC information includes the server URL, the generated authentication ID "XXX", the AT1 for UL being stored in the memory 34, the AP information 38 being stored in the memory 34, and the MAC address MA of the printer 10. When the process of T42 ends, the processes of FIG. 3 end.

Figure 4:
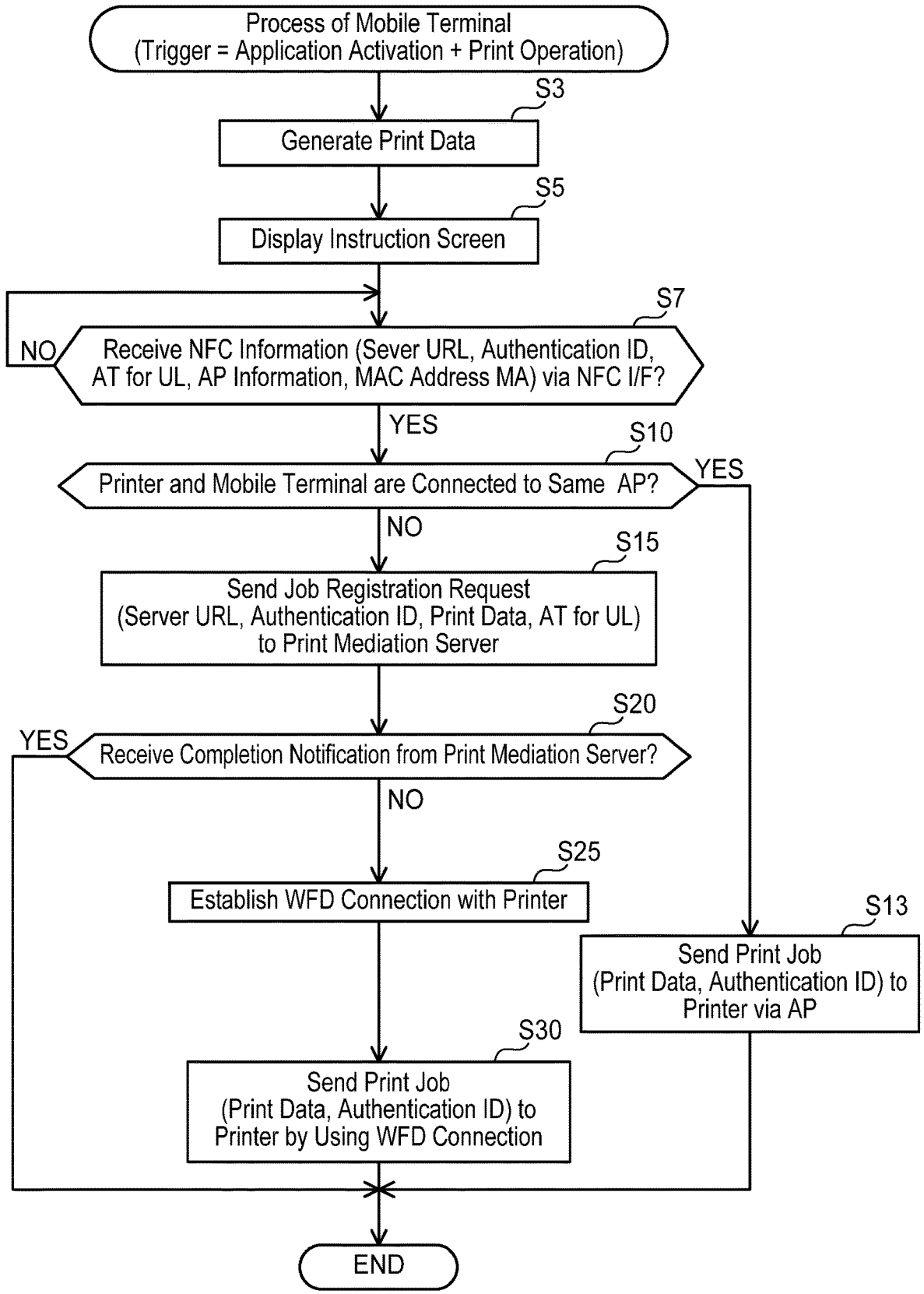
FIG. 4 shows a flowchart of processes executed by a mobile terminal.

(Process of Mobile Terminal 100; FIG. 4)

Next, processes executed by the CPU 132 of the mobile terminal 100 will be described with reference to FIG. 4. The processes of FIG. 4 are executed in a case where the app 138 is activated in the mobile terminal 100 and the print operation is accepted from the second user.

In S3, the mobile terminal 100 generates print data from image data selected in the print operation.

In S5, the mobile terminal 100 causes an instruction screen that instructs that the mobile terminal 100 is to be brought close to the printer 10 to be displayed on the display unit 114. As a result, the mobile terminal 100 is brought close to the printer 10 by the second user, and an NFC connection between the NFC I/F 18 of the printer 10 and the NFC I/F 118 of the mobile terminal 100 is established.

In S7, the mobile terminal 100 monitors reception of the NFC information from the printer 10 via the NFC I/F 118. In case of receiving the NFC information from the printer 10 ((7) of FIG. 1), the mobile terminal 100 determines YES in S7 and proceeds to S10. The NFC information includes the server URL, the authentication ID, the AT for UL, the AP information 38, and the MAC address MA.

In S10, the mobile terminal 100 determines whether the printer 10 and the mobile terminal 100 are connected to a same AP. Here, in a situation where a wireless connection with an AP has been established, the mobile terminal 100 is storing, in the memory 134, information (e.g., SSID, etc.) for establishing that wireless connection. In a case where the SSID being stored in the memory 134 matches the SSID in the AP information 38 included in the NFC information (i.e., the SSID of the AP to which the printer 10 is currently connected), the mobile terminal 100 determines YES in S10, and proceeds to S13. On the other hand, in a case where an SSID is not being stored in the memory 134, or in a case where the SSID being stored in the memory 134 does not match the SSID in the AP information included in the NFC information, the mobile terminal 100 determines NO in S10, and proceeds to S15.

In S13, the mobile terminal 100 sends a print job to the printer 10 via the Wi-Fi I/F 116 by using the AP to which the mobile terminal 100 is currently connected. The print job includes the print data generated in S3 and the authentication ID included in the NFC information. When the process of S13 ends, the processes of FIG. 4 end. In a situation where the printer 10 and the mobile terminal 100 are connected to the same AP (YES in S10), the mobile terminal 100 sends the print job to the printer 10 via that AP, and therefore does not need to execute communication with the server 200. Consequently, processing load of the mobile terminal 100 can be reduced.

In S15, the mobile terminal 100 sends a job registration request to the server 200 via the mobile I/F 120. The job registration request includes the server URL included in the NFC information received in S7, the authentication ID included in the NFC information, the print data generated in S5, and the AT for UL included in the NFC information.

In S20, the mobile terminal 100 monitors reception, from the server 200 via the mobile I/F 120, of a completion notification indicating that the job information has been registered. In case of receiving the completion notification from the server 200, the mobile terminal 100 determines YES in S20, and ends the processes of FIG. 4. On the other hand, in case of not receiving the completion notification from the server 200 within a predetermined period, the mobile terminal 100 determines NO in S20, and proceeds to S25. The situation where the completion notification is not received from the server 200 is a situation in which communication between the mobile terminal 100 and the server 200 via the Internet 4 cannot be executed due to some trouble occurring in the server 200 for example.

In S25, the mobile terminal 100 establishes a wireless connection (referred to as "WFD connection" below) with the printer 10 according to the WFD scheme by using the MAC address MA included in the NFC information. Specifically, the mobile terminal 100 sends a Probe request by broadcast via the Wi-Fi I/F 116, and receives a plurality of Probe responses from a plurality of devices. Each of the plurality of Probe responses includes a MAC address of a device that is the sending source of the Probe response. In this case, the mobile terminal 100 specifies, from among the plurality of Probe responses, a Probe response that includes the MAC address MA (i.e., the Probe response sent from the printer 10) which matches the MAC address MA in the NFC information received in S7. Next, the mobile terminal 100 sends a Probe request including the MAC address MA in the specified Probe response to the device that is the sending source of the Probe response (i.e., the printer 10) via the Wi-Fi I/F 116, and receives a Probe response from the printer 10. Then, the mobile terminal 100 executes communication of various signals with the printer 10 (Provision Discovery, WSC Exchange, Association, 4-way handshake, etc.) via the Wi-Fi I/F 116. In the communication of the WSC Exchange, the mobile terminal 100 receives, from the printer 10, an SSID and password used in the wireless network in which the printer 10 operates as the G/O. In this case, in the process of executing the communication of the Association and the 4-way handshake, the mobile terminal 100 further sends the received SSID and password to the printer 10. Then, the authentication of the SSID and password in the printer 10 succeeds and, as a result, the mobile terminal 100 establishes a WFD connection with the printer 10, and participates as a client of the WFD scheme in the wireless network in which the printer 10 operates as the G/O.

In S30, the mobile terminal 100 sends a print job to the printer 10 via the Wi-Fi I/F 116 by using the established WFD connection. The print job includes the print data and the authentication ID. When the process of S30 ends, the processes of FIG. 4 end.

As described above, in the situation where the completion notification is not received from the server 200, i.e., in the situation where the mobile terminal 100 and the server 200 cannot execute communication via the Internet 4, the mobile terminal 100 establishes a WFD connection with the printer 10 (S25), and sends the print job to the printer 10 by using the established WFD connection (S30). Consequently, even in a situation where communication between the mobile terminal 100 and the server 200 via the Internet 4 cannot be executed, it is possible to cause the printer 10 to execute printing appropriately.

Figure 5:
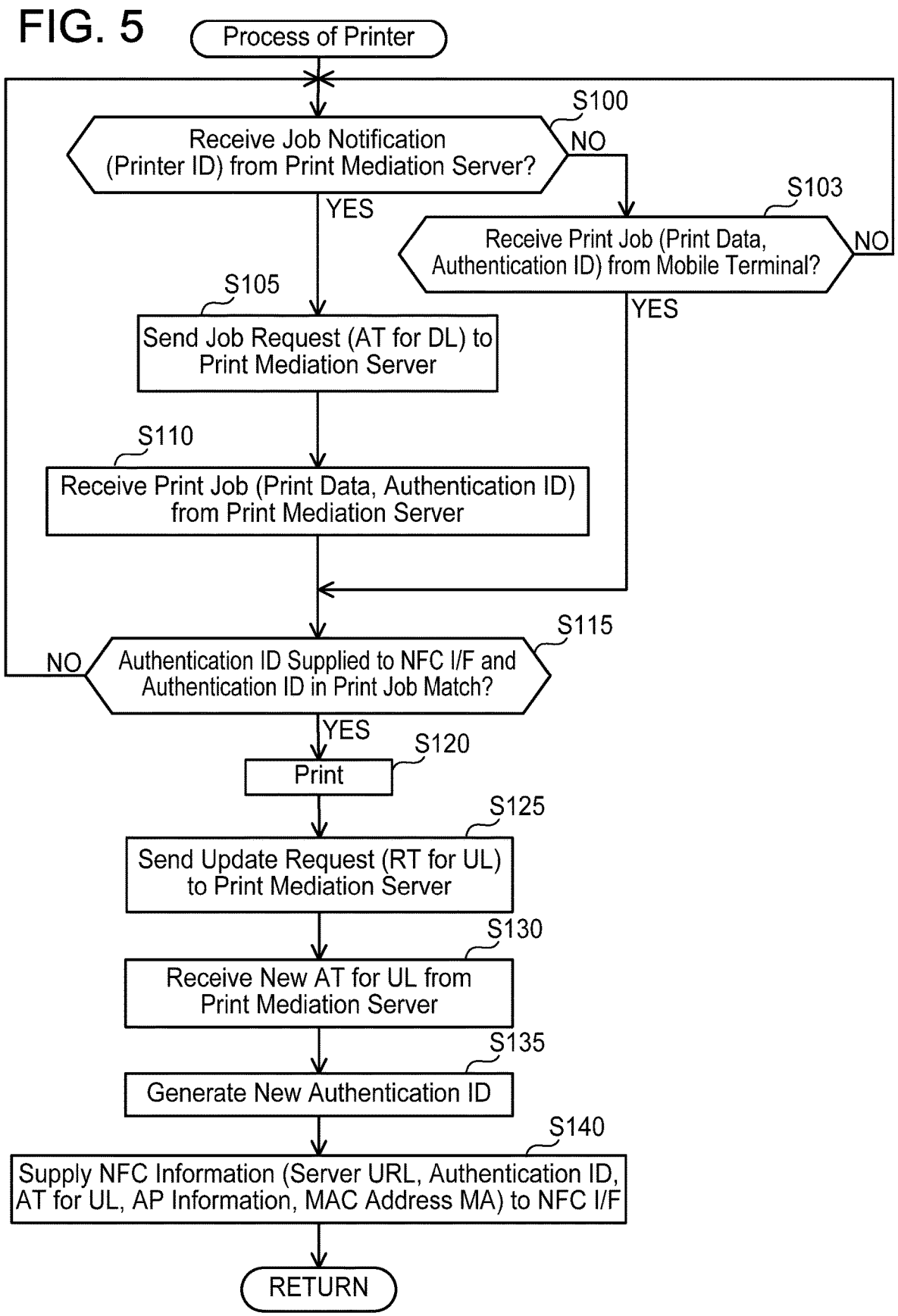
FIG. 5 shows a flowchart of processes executed by a printer.

(Processes of Printer 10; FIG. 5)

Next, processes executed by the CPU 32 of the printer 10 will be described with reference to FIG. 5. The processes of FIG. 5 are executed after the processes of FIG. 3 have been executed. In S100, the printer 10 monitors reception of a job notification including the printer ID "Printer 10" of the printer 10 from the server 200 via the Wi-Fi I/F 16. In case of receiving the job notification from the server 200 ((9) of FIG. 1), the printer 10 determines YES in S100, and proceeds to S105. On the other hand, in case of not receiving the job notification from the server 200, the printer 10 determines NO in S100, and proceeds to S103.

In S103, the printer 10 monitors reception of a print job including print data and an authentication ID from the mobile terminal 100 via the Wi-Fi I/F 16. In case of receiving the print job from the mobile terminal 100 (see S13 or S30 of FIG. 4), the printer 10 determines YES in S103, and proceeds to S115. On the other hand, in case of not receiving the print job from the mobile terminal 100, the printer 10 determines NO in S103, and returns to S100.

In S105, the printer 10 sends a job request including the AT for DL being stored in the memory 34 to the server 200 via the Wi-Fi I/F 16 ((10) of FIG. 1).

In S110, the printer 10 receives the print job including the print data and the authentication ID from the server 200 via the Wi-Fi I/F 16 ((11) of FIG. 1).

In S115, the printer 10 determines whether the authentication ID supplied to the NFC I/F 18 (see T42 of FIG. 3) and the authentication ID included in the print job received in S110 or S103 match. The printer 10 proceeds to S120 in case of determining that the two authentication IDs match (YES in S115), and returns to S100 in case of determining that the two authentication IDs do not match (NO in S115).

In S120, the printer 10 supplies the print data included in the print job to the print executing unit 20, and causes the print executing unit 20 to execute printing of an image represented by the print data.

Here, the situation in which it is determined that the two authentication IDs match (i.e., YES in S115) means the following. For example, a situation in which YES is determined in S115 after YES was determined in S100 means that the print data included in the print job is data uploaded to the server 200 by a sending destination of the NFC information (i.e., the mobile terminal 100). Further, a situation in which YES is determined in S115 after YES was determined in S103 means that the print job has been received from the sending destination of the NFC information (i.e., the mobile terminal 100). Consequently, in the case where YES is determined in S115, the printer 10 can appropriately print the print data generated by the sending destination of the NFC information. On the other hand, in the case where NO is determined in S115, the printer 10 does not execute printing. That is, the printer 10 does not execute printing according to print data generated by a device that is not the sending destination of the NFC information. Consequently, the printer 10 can increase security of printing.

In S125, the printer 10 sends an update request for requesting an update of the AT for UL to the server 200 via the Wi-Fi I/F 16. The update request includes the RT for UL being stored in the memory 34. As a result, in the server 200, a new AT for UL is generated, and the generated new AT for UL is registered instead of the AT for UL that is already registered (i.e., the AT for UL prior to the update). Thereby, for example, even if the mobile terminal 100 sends a job registration request including the AT for UL prior to the update to the server 200, the job information is not registered in the server 200. It is possible to prevent the mobile terminal 100 from causing the printer 10 to print many times using the same AT for UL.

In S130, the printer 10 receives the new AT for UL from the server 200 via the Wi-Fi I/F 16, and stores the new AT for UL in the memory 34 instead of the AT for UL already being stored (i.e., the AT for UL prior to the update).

In S135, the printer 10 generates a new authentication ID having a character string different from the authentication ID supplied to the NFC I/F 18.

In S140, the printer 10 supplies the NFC information to the NFC I/F 18, and stores the NFC information in the memory 19 of the NFC I/F 18. The NFC information includes the server URL, the authentication ID generated in S135, the AT for UL received from the server 200 in S130, the AP information 38 stored in the memory 34, and the MAC address MA of the printer 10. When the process of S140 ends, the processes of FIG. 5 end and return to S100.

Figure 6:
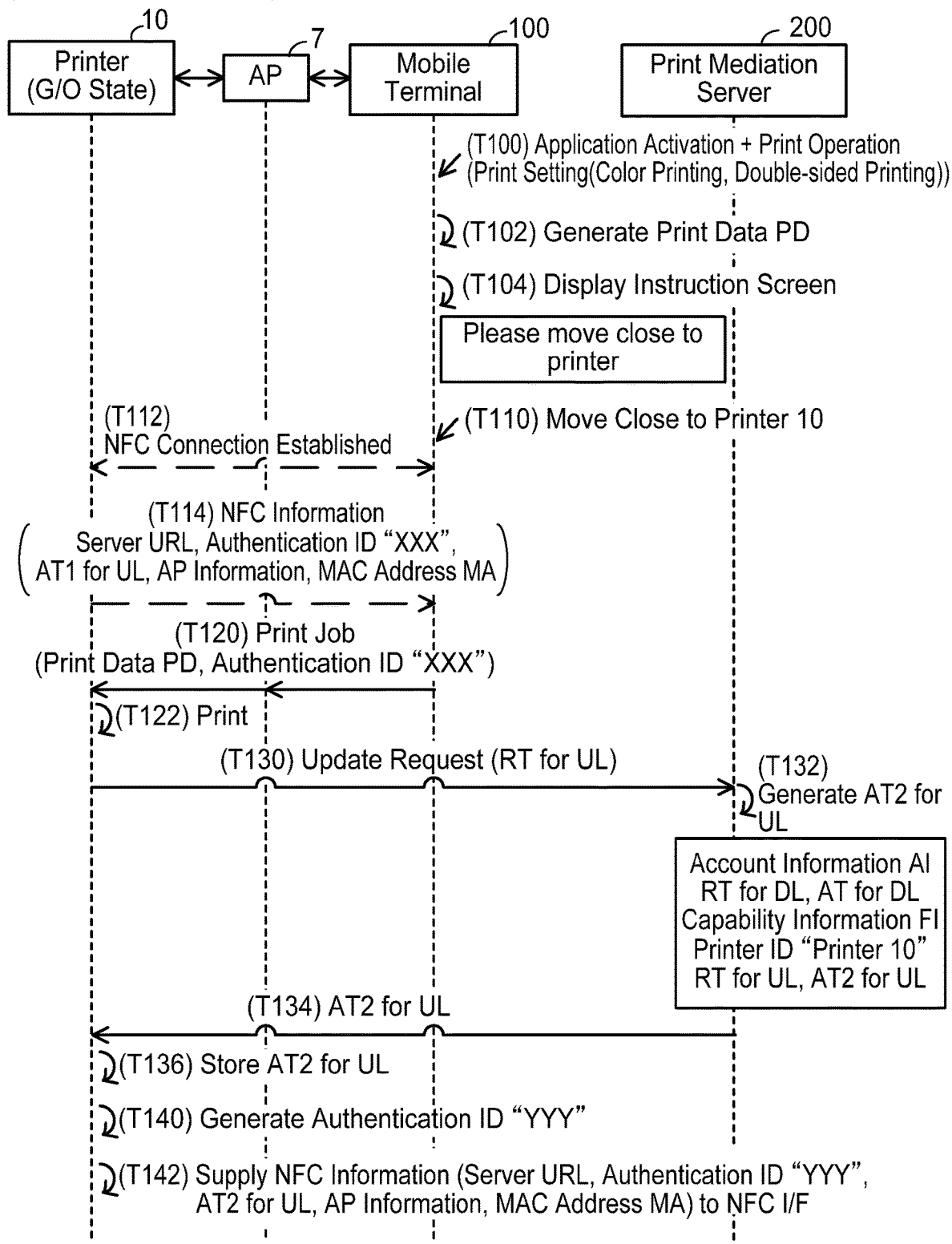
FIG. 6 shows a sequence diagram of a case A of a print process.
Figure 7:
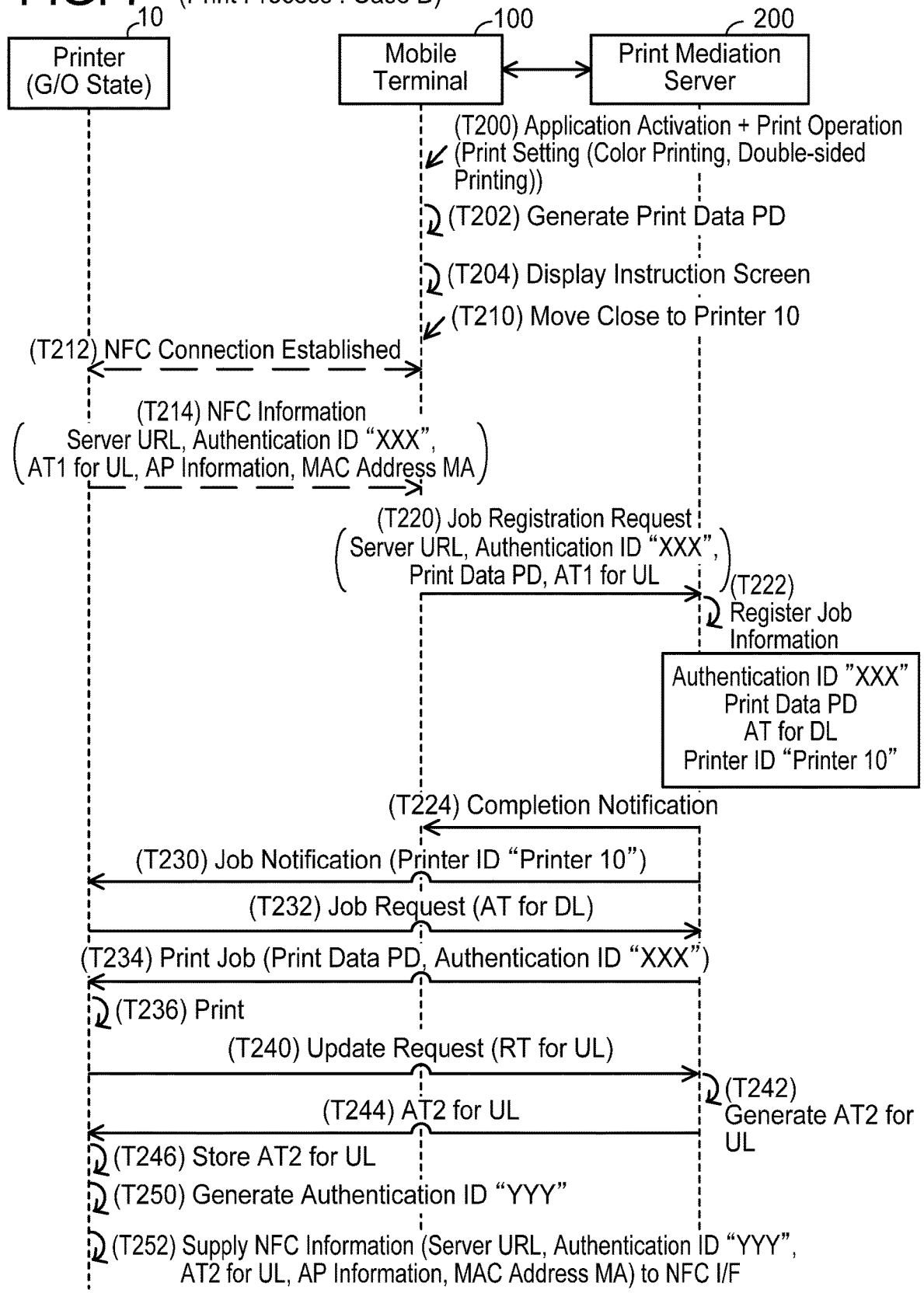
FIG. 7 shows a sequence diagram of a case B of the print process.
Figure 8:
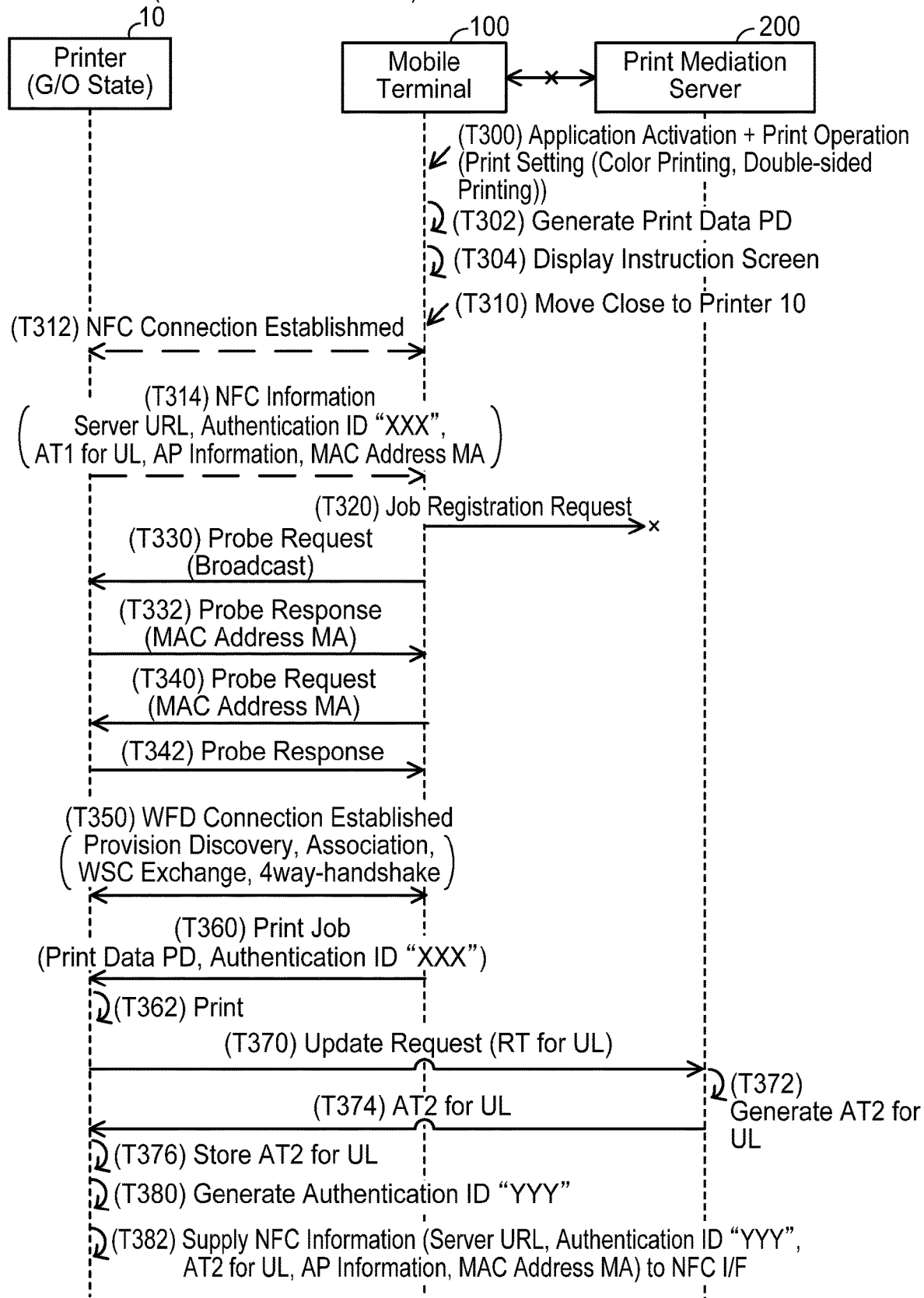
FIG. 8 shows a sequence diagram of a case C of the print process.

Specific Examples; FIG. 6 to FIG. 8

Next, specific cases of the print processes being realized by the processes of FIG. 4 and FIG. 5 will be described with reference to FIG. 6 to FIG. 8. The processes of FIG. 6 to FIG. 8 are executed after the processes of FIG. 3. First, a process of case A, in which the mobile terminal 100 sends a print job to the printer 10 via the AP 7 will be described with reference to FIG. 6. In case A, not only the printer 10, but also the mobile terminal 100, is connected to the AP 7. That is, the mobile terminal 100 stores the SSID "abc" of the AP 7 in the memory 134.

In T100, the mobile terminal 100 accepts an operation for activating the app 138 and a print operation from the second user. In the print operation, a combination of color printing and double-sided printing is designated as the print setting to be used by the printer 10. In this case, in T102 the mobile terminal 100 generates print data PD from the image data (S3 of FIG. 4), and in T104 causes the instruction screen to be displayed on the display unit 114 (S5).

In T110, the mobile terminal 100 is brought close to the printer 10 by the second user. Thereby, in T112, an NFC connection is established between the NFC I/F 18 of the printer 10 and the NFC I/F 118 of the mobile terminal 100.

In the case where the NFC connection with the mobile terminal 100 is established in T112, in T114 the NFC I/F 18 of the printer 10 sends the NFC information being stored in the memory 19 to the mobile terminal 100. The NFC information includes the server URL, the authentication ID "XXX", the AT1 for UL, the AP information 38, and the MAC address MA.

In case of receiving the NFC information from the printer 10 via the NFC I/F 118 in T114 (YES in S7 of FIG. 4), the mobile terminal 100 determines that the SSID "abc" being stored in the memory 134 and the SSID "abc" in the AP information 38 included in the NFC information match (YES in S10), and in T120 sends a print job to the printer 10 via the Wi-Fi I/F 116 by using the AP 7 (S13). The print job includes the print data PD, and the authentication ID "XXX" included in the NFC information.

In case of receiving the print job from the mobile terminal 100 via the Wi-Fi I/F 16 in T120 (NO in S100 and YES in S103 of FIG. 5), the printer 10 determines that the authentication ID "XXX" supplied to the NFC I/F 18 in T42 of FIG. 3 and the authentication ID "XXX" included in the print job match (YES in S115). In this case, in T122 the printer 10 executes printing of an image represented by the print data PD included in the print job (S120).

In T130, the printer 10 sends an update request including the RT for UL being stored in the memory 34 to the server 200 via the Wi-Fi I/F 16 (S125 of FIG. 5).

In case of receiving the update request from the printer 10 in T130, in T132 the server 200 generates a new AT for UL (referred to as "AT2 for UL" below), registers the AT2 for UL in the printer information instead of the AT1 for UL, and in T134 sends the AT2 for UL to the printer 10.

In case of receiving the AT2 for UL from the server 200 via the Wi-Fi I/F 16 in T134 (S130 of FIG. 5), in T136 the printer 10 stores the AT2 for UL in the memory 34 instead of the AT1 for UL.

In T140 the printer 10 generates an authentication ID "YYY" different from the authentication ID "XXX" (S135 of FIG. 5), and in T142 supplies NFC information to the NFC I/F 18. The NFC information includes the server URL, the authentication ID "YYY", the AT2 for UL, the AP information 38, and the MAC address MA. When the process of T142 ends, the processes of case A end.

(Case B; FIG. 7)

Next, processes of a case B will be described in which the print data PD is uploaded onto the server 200 from the mobile terminal 100. In case B, the mobile terminal 100 is not connected with the AP 7. That is, the mobile terminal 100 is not storing the SSID "abc" of the AP 7 in the memory 134. Further, the mobile terminal 100 is capable of communicating with the server 200 via the mobile I/F 120.

T200 to T214 are the same as T100 to T114 of FIG. 6. In the present case, since the SSID is not being stored in the memory 134, the mobile terminal 100 determines that the printer 10 and the mobile terminal 100 are not connected with the same AP (NO in S10 of FIG. 4), and in T220 sends a job registration request to the server 200 via the mobile OF 120 (S15). The job registration request includes the server URL included in the NFC information, the authentication ID "XXX" included in the NFC information, the print data PD, and the AT1 for UL included in the NFC information.

In case of receiving the job registration request from the mobile terminal 100 in T220, the server 200 specifies the printer information including the AT1 for UL included in the job registration request (see T32 of FIG. 3), and in T222 stores job information. The job information includes the authentication ID "XXX" included in the job registration request, the print data PD included in the job registration request, the AT for DL included in the specified printer information, and the printer ID "Printer 10" included in the specified printer information.

In T224, the mobile terminal 100 receives a completion notification from the server 200 via the mobile OF 120 (YES in S20 of FIG. 4).

In T230, the printer 10 receives a job notification including the printer ID "Printer 10" from the server 200 via the Wi-Fi OF 16 (YES in S100 of FIG. 5). In this case, in T232 the printer 10 sends a job request including the AT for DL being stored in the memory 34 to the server 200 via the Wi-Fi OF 16 (S105).

In case of receiving the job request from the printer 10 in T232, the server 200 specifies the job information including the AT for DL included in the job request, and in T234 sends a print job including the print data PD and the authentication ID "XXX" in the specified job information to the printer 10.

In case of receiving the print job from the server 200 via the Wi-Fi OF 16 in T234 (S110 of FIG. 5), the printer 10 determines that the authentication ID "XXX" supplied to the NFC OF 18 in T42 of FIG. 3 and the authentication ID "XXX" included in the print job match (YES in S115). In this case, in T236 the printer 10 executes printing of an image represented by the print data PD included in the print job (S120). T240 to T252 are the same as T130 to T142 of FIG. 6. When the process of T252 ends, the processes of case B end.

(Case C; FIG. 8)

Next, processes of a case C, in which the mobile terminal 100 sends a print job to the printer 10 by using a WFD connection, will be described with reference to FIG. 8. In case C, the mobile terminal 100 is not connected with the AP 7. Further, the mobile terminal 100 is not capable of communicating with the server 200.

T300 to T314 are the same as T100 to T114 of FIG. 6. Since the SSID is not being stored in the memory 134, the mobile terminal 100 determines that the printer 10 and the mobile terminal 100 are not connected with the same AP (NO in S10 of FIG. 4), and in T320 attempts to send a job registration request to the server 200 via the mobile I/F 120 (S15). However, in the present case, since the mobile terminal 100 and the server 200 are not capable of communicating with each other, the job registration request is not received in the server 200, and the completion notification is not sent from the server 200. In this case, the mobile terminal 100 determines that the completion notification has not been received from the server 200 (NO in S20), and in T330 sends a Probe request by broadcast via the Wi-Fi I/F 116.

In case of receiving the Probe request from the mobile terminal 100 via the Wi-Fi I/F 16 in T330, in T332 the printer 10 sends a Probe response including the MAC address MA of the printer 10 to the mobile terminal 100.

In case of receiving the Probe response from the printer 10 via the Wi-Fi I/F 116 in T332, the mobile terminal 100 specifies the Probe response including the MAC address that matches the MAC address MA included in the NFC information. Next, in T340 the mobile terminal 100 sends, to the printer 10 via the Wi-Fi I/F 116, a Probe request including the MAC address MA included in the specified Probe response.

In case of receiving the Probe request from the mobile terminal 100 via the Wi-Fi I/F 16 in T340, in T342 the printer 10 sends a Probe response to the mobile terminal 100.

In case of receiving the Probe response from the printer 10 via the Wi-Fi I/F 116 in T342, in T350 the mobile terminal 100 executes the communication of various signals (Provision Discovery, WSC Exchange, Association, 4-way handshake, etc.) with the printer 10, and establishes a WFD connection with the printer 10 (S25 of FIG. 4).

In T360, the mobile terminal 100 sends a print job including the print data PD and the authentication ID "XXX" to the printer 10 via the Wi-Fi I/F 116 by using the established WFD connection (S30 of FIG. 4).

In case of receiving the print job from the mobile terminal 100 via the Wi-Fi I/F 16 in T360 (NO in S100 and YES in S103 of FIG. 5), the printer 10 determines that the authentication ID "XXX" supplied to the NFC I/F 18 in T42 of FIG. 3 and the authentication ID "XXX" included in the print job match (YES in S115). In this case, in T362 the printer 10 executes printing of an image represented by the print data PD included in the print job (S120). T370 to T382 are the same as T130 to T142 of FIG. 6. When the process of T382 ends, the processes of case C end.

Effect of Present Embodiment

According to the present embodiment, the printer 10 sends the token for UL request including the account information AI to the server 200 (T30 of FIG. 3), receives the token for UL including the RT for UL and the AT1 for UL from the server 200 (T34), and supplies the AT1 for UL to the NFC I/F 18 (T42). As a result, the AT1 for UL is sent to the mobile terminal 100 by using the NFC connection with the mobile terminal 100 (T114 of FIG. 7), and the print data PD is uploaded from the mobile terminal 100 to the server 200 (T220). Thereby, the printer 10 can receive the print data PD from the server 200 (T234), and execute printing of an image represented by the print data PD (T236). Consequently, in the case where the NFC connection between the printer 10 and the mobile terminal 100 is established, the printer 10 can execute printing of an image represented by the print data PD without another wireless connection between the printer 10 and the mobile terminal 100 being established.

(Correspondence Relationship)

The mobile terminal 100 and the server 200 are examples of "a terminal device", "a server", respectively. The NFC I/F 18 and the Wi-Fi I/F 16 of the printer 10 are examples of "a first type interface", "a second type interface" of "a printer", respectively. The NFC I/F 118 and the Wi-Fi I/F 116 of the mobile terminal 100 are examples of "a first type interface", "a second type interface" of the "terminal device", respectively. The AT1 for UL, the AT2 for UL, the RT for UL are examples of "communication information", "new communication information", "a refresh token", respectively. The authentication ID "XXX" is an example of "first authentication information". The MAC address MA is an example of "connection information".

The process of T34 of FIG. 3 is an example of a process executed by "in a case where account information for logging in to a server is sent to the server, receive communication information from the server via the second type interface" of the "printer". The process of T42 of FIG. 3 is an example of a process executed by "supply the communication information to the first type interface in a case where the communication information is received from the server" of the "printer". The process of S110 of FIG. 5 is an example of a process executed by "receive the print data from the server via the second type interface in a case where the print data is uploaded onto the server due to the terminal device using the communication information without sending the account information to the server after the communication information has been sent to the terminal device" of the "printer". The process of S120 of FIG. 5 is an example of a process executed by "cause the print executing unit to print the target image represented by the print data in a case where the print data is received from the server" of the "printer".

The process of S7 is an example of a process executed by "in a case where a first wireless connection with a printer via a first type interface of the terminal device is established, receive communication information from the printer via the first type interface by using the first wireless connection" of the "terminal device". The process of S15 of FIG. 4 is an example of a process executed by "in a case where the communication information is received from the printer, upload the print data onto the server by using the communication information without sending account information to the server" of the "terminal device".

Figure 9:
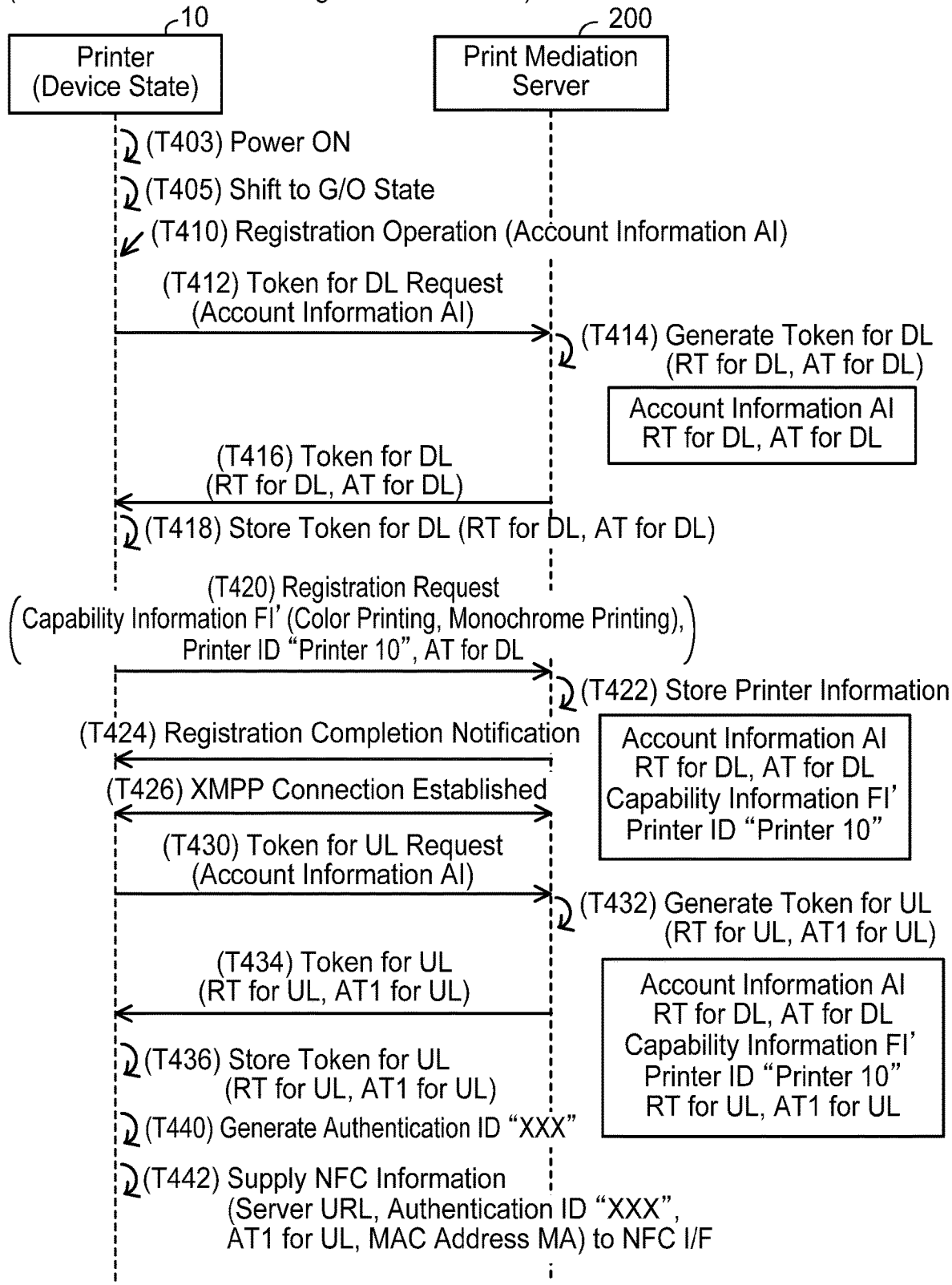
FIG. 9 shows a registration process of a second embodiment.
Figure 10:
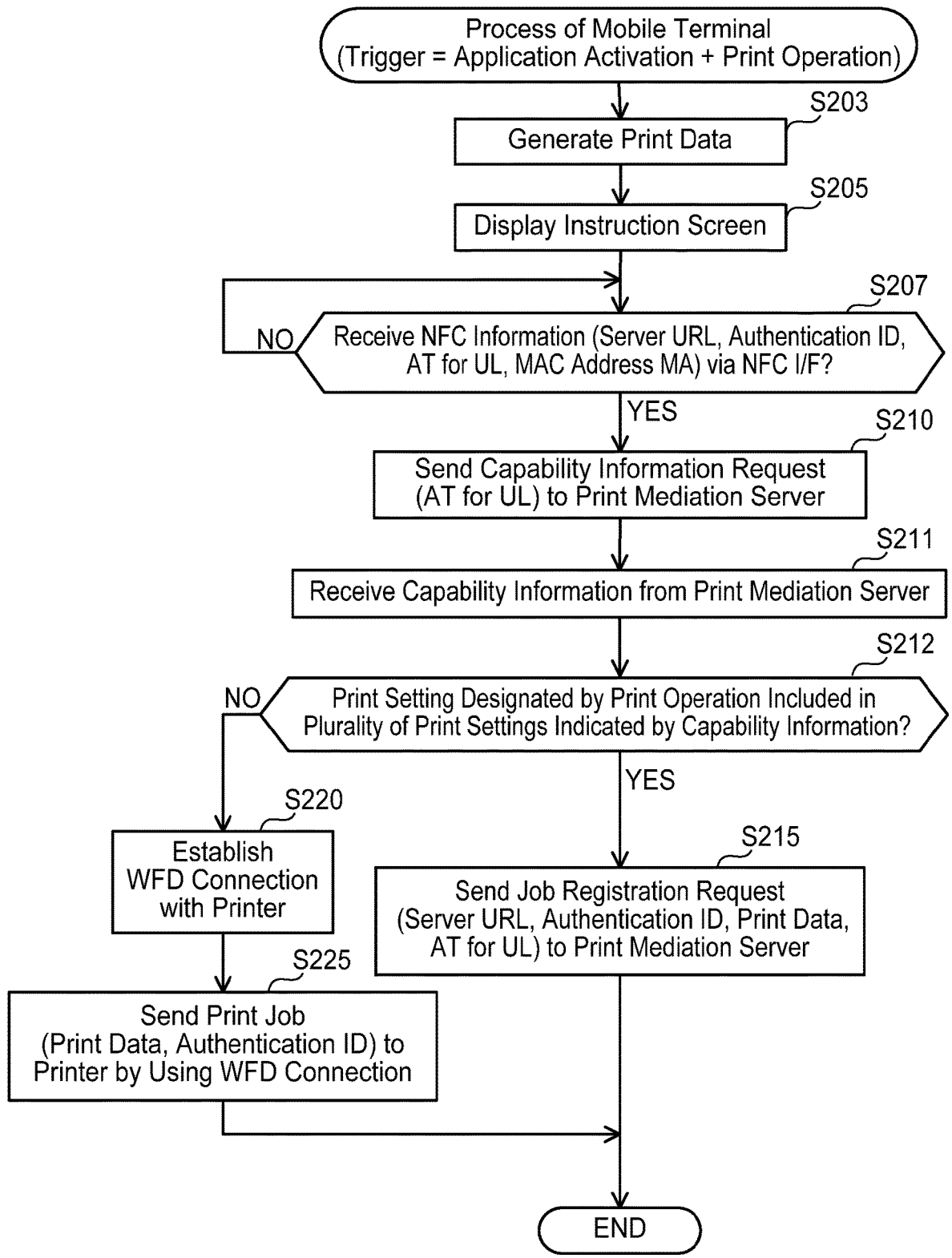
FIG. 10 shows a flowchart of processes executed by a mobile terminal of the second embodiment.
Figure 11:
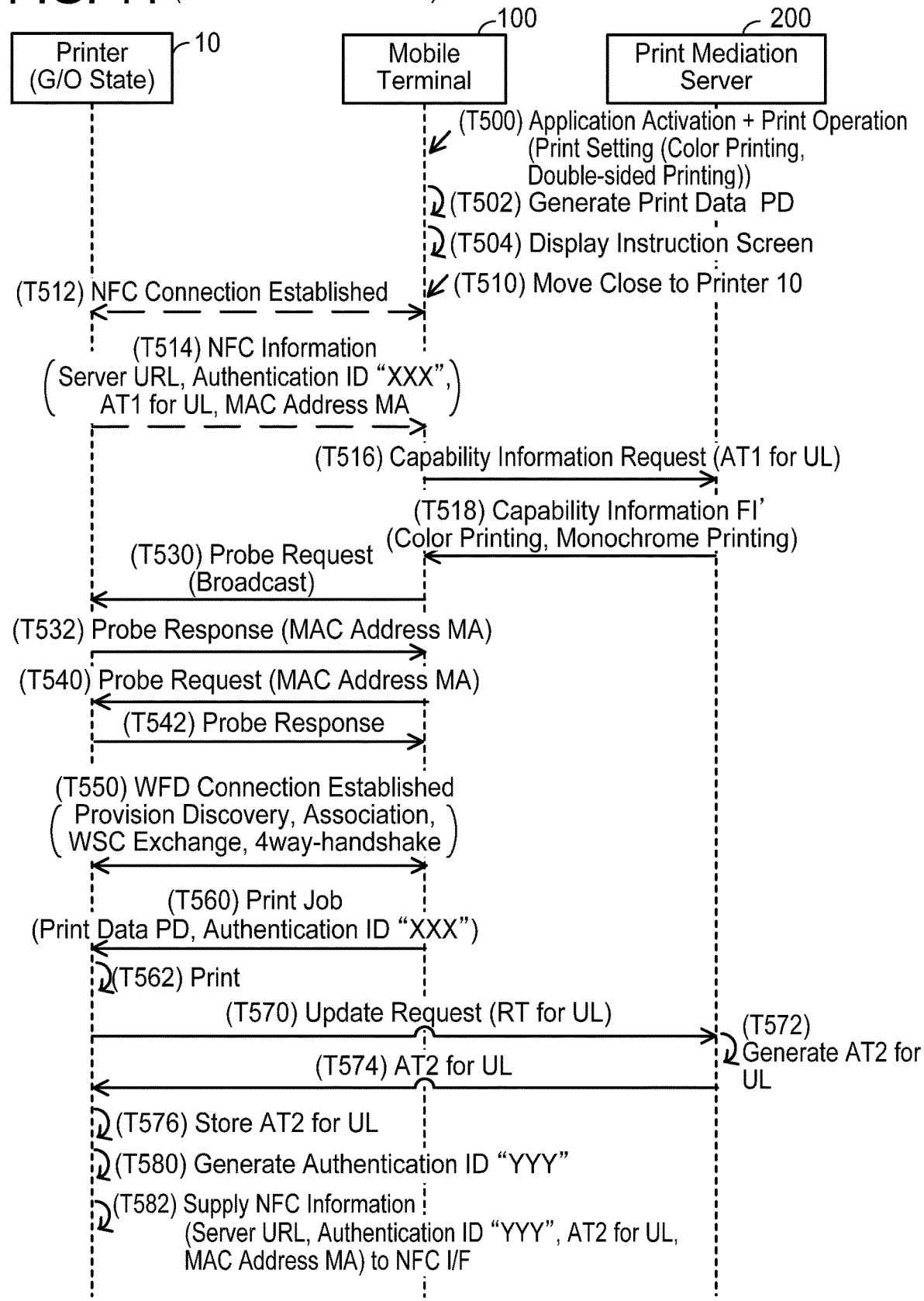
FIG. 11 shows a sequence diagram of a case D of the print process.

Second Embodiment; FIG. 9 to FIG. 11

Next, a second embodiment will be described with reference to FIG. 9 to FIG. 11. First, a registration process of the second embodiment will be described with reference to FIG. 9. In the second embodiment, a situation is assumed in which, due for example to the model of the printer 10, the printer 10 cannot send, to the server 200, a registration request including all the capability information H being stored in the memory 34.

T403 to T418 are the same as T3 to T18 of FIG. 3. In T420, the printer 10 sends a registration request including capability information FI', the printer ID "Printer 10", and the AT for DL to the server 200 via the Wi-Fi I/F 16. The capability information FI' includes only the two settings that are the number of printing colors (i.e., color printing and monochrome printing) in the capability information FI stored in the memory 34. That is, the capability information FI' indicates that the printer 10 is capable of using only the two print settings (i.e., color printing or monochrome printing).

In case of receiving the registration request from the printer 10 in T420, in T422 the server 200 stores printer information. The printer information includes the account information AI, the RT for DL, the AT for DL, the capability information FI' included in the registration request, and the printer ID "Printer I" included in the registration request. T424 to T442 are the same as T24 to T42 of FIG. 3 excepting for a point that the NFC information does not include the AP information 38. Moreover, in a variant, the NFC information may include the AP information 38.

(Processes of Mobile Terminal 100; FIG. 10)

Next, processes executed by the CPU 132 of the mobile terminal 100 will be described with reference to FIG. 10. The processes of FIG. 10 are executed instead of the processes of FIG. 4. S203 to S207 are the same as S3 to S7 of FIG. 4 excepting for the point that the NFC information does not include the AP information 38.

In S210, the mobile terminal 100 sends a capability information request requesting sending of the capability information registered in the server 200 to the server 200 via the Wi-Fi I/F 116. The capability information request includes the AT for UL included in the NFC information.

In S211, the mobile terminal 100 receives the capability information from the server 200 via the Wi-Fi I/F 16.

In S212, the mobile terminal 100 determines whether the print setting designated in the print operation is included in the plurality of print settings indicated by the received capability information. The mobile terminal 100 proceeds to S215 in case of determining that the print setting designated in the print operation is included in the plurality of print settings indicated by the capability information (YES in S212). S215 is the same as S15 of FIG. 4. That is, the mobile terminal 100 sends a job registration request to the server 200 via the mobile I/F 120. On the other hand, the mobile terminal 100 proceeds to S220 in case of determining that the print setting designated in the print operation is not included in the plurality of print settings indicated by the capability information (NO in S212). S220 and S225 are the same as S25 and S30 of FIG. 4. That is, the mobile terminal 100 establishes a WFD connection with the printer 10, and sends a print job to the printer 10 by using the WFD connection. When the process of S215 or S225 ends, the processes of FIG. 10 end.

(Case D; FIG. 11)

Next, a case D of the print processes realized by the processes of FIG. 10 will be described with reference to FIG. 11. After the processes of FIG. 9 have been executed, the processes of FIG. 11 are executed.

T500 to T514 are the same as T200 to T214 of FIG. 7 excepting for the point that the NFC information does not include the AP information 38. In T516, the mobile terminal 100 sends a capability information request including the AT1 for UL included in the NFC information to the server 200 via the mobile I/F 120 (S210 of FIG. 10).

In case of receiving the capability information request from the mobile terminal 100 in T516, the server 200 specifies the printer information including the AT1 for UL included in the capability information request (see T432 of FIG. 9), and, in T518 sends the capability information FT (i.e., color printing and monochrome printing) included in the specified printer information to the mobile terminal 100.

In case of receiving the capability information FI' from the server 200 via the Wi-Fi I/F 116 in T518 (S211 of FIG. 10), the mobile terminal 100 determines that the print settings designated in T500 (i.e., the combination of color printing and double-sided printing) are not included in the two print settings (i.e., color printing or monochrome printing) indicated by the capability information FI' (NO in S212), and executes the processes of T530 to T582. T530 to T582 are the same as T330 to T382 of FIG. 8 excepting for the point that the NFC information does not include the AP information 38. When the process of T582 ends, the processes of case D end.

Effect of Present Embodiment

For example, a situation is assumed in which the print data PD is uploaded onto the server 200 from the mobile terminal 100 even in case of determining that the print settings designated in T500 are not included among the two print settings indicated by the capability information FI' (NO in S212 of FIG. 10). In this case, since only the capability information FI' (i.e., color printing and monochrome printing) is registered in the server 200, printing according to the print settings designated by the second user (i.e., color printing and double-sided printing) may not be executed appropriately by the printer 10. By contrast, in the present embodiment, the mobile terminal 100 sends the capability information request to the server 200 (T516 of FIG. 11), receives the capability information FI' from the server 200 (T518), and in case of determining that the print settings designated in T500 (i.e., the combination of color printing and double-sided printing) are not included in the two print settings (i.e., color printing or monochrome printing) indicated by the capability information FI', the mobile terminal 100 establishes a WFD connection with the printer 10 (T550) without uploading the print data PD to the server 200, and sends the print job to the printer 10 by using the WFD connection (T560). Consequently, the printer 10 can be caused to appropriately execute printing according to the print settings designated by the second user.

(Correspondence Relationship)

The print settings designated in T500 of FIG. 11 (i.e., the combination of color printing and double-sided printing) are an example of "a target print setting".

Figure 12:
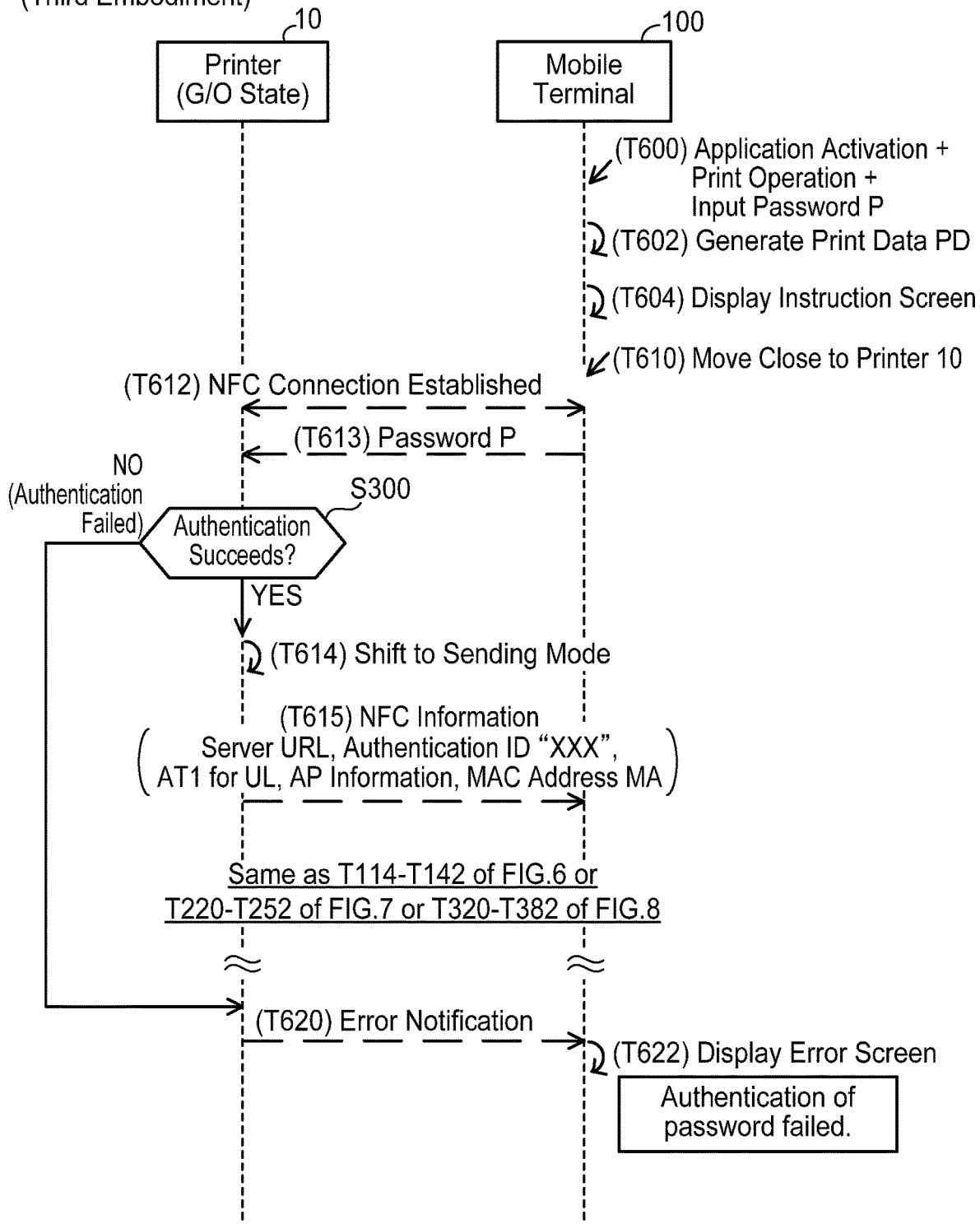
FIG. 12 shows a sequence diagram of a print process of a third embodiment.

Third Embodiment; FIG. 12

Next, a third embodiment will be described with reference to FIG. 12. The third embodiment is different from the first embodiment in a point that a password P (see FIG. 2) has been stored in advance in the memory 34 of the printer 10. The processes of FIG. 12 are executed after the processes of FIG. 3 have been executed. That is, the NFC information is being stored in the memory 19 of the NFC I/F 18 (see T42 of FIG. 3). Moreover, in the present embodiment, in an initial state of FIG. 12, the printer 10 is operating in normal mode in which the NFC I/F 18 is incapable of sending NFC information.

In T600, the mobile terminal 100 further accepts an operation of inputting the password P from the second user in addition to the operation for activating the app 138 and the print operation. T602 to T612 are the same as T102 to T112 of FIG. 6.

In the case where an NFC connection with the printer 10 is established in T612, in T613 the mobile terminal 100 sends the password P inputted in T600 to the printer 10 via the NFC I/F 118 by using the established NFC connection.

In case of receiving the password P from the mobile terminal 100 via the NFC I/F 18 in T613, in S300 the printer 10 determines whether the password P being stored in the memory 34 and the received password P match. In case of determining that the two passwords P match (YES in S300), the printer 10 determines that authentication of the password P has succeeded, and in T614 shifts the state of the printer 10 from normal mode to sending mode in which the NFC I/F 18 is capable of sending NFC information. More specifically, the printer 10 supplies, to the NFC I/F 18, a sending instruction for instructing sending of the NFC information. As a result, in T615 the NFC I/F 18 of the printer 10 sends the NFC information being stored in the memory 19 to the mobile terminal 100. Thereafter, the same processes as T114 to T142 of FIG. 6, or T220 to T252 of FIG. 7, or T320 to T382 of FIG. 8 are executed, and the processes of FIG. 12 end.

On the other hand, in case of determining that the two passwords P do not match (NO in S300), the printer 10 determines that authentication of the password P has failed, and in T620 sends an error notification indicating that authentication of the password has failed to the mobile terminal 100 via the NFC I/F 18.

In case of receiving the error notification from the printer 10 via the NFC I/F 118 in T620, in T622 the mobile terminal 100 causes an error screen indicating that authentication of the password has failed to be displayed on the display unit 114. When the process of T622 ends, the processes of FIG. 12 end.

Effect of Present Embodiment

According to the present embodiment, in case of receiving the password P from the mobile terminal 100 via the NFC I/F 18 (T613), the printer 10 determines whether the password P being stored in the memory 34 and the received password P match (S300). In case of determining that the two passwords P match (YES in S300), the printer 10 changes the state of the printer 10 from normal mode to sending mode (T614). As a result, the NFC information is sent from the printer 10 to the mobile terminal 100 (T615). On the other hand, in case of determining that the two passwords do not match (NO in S300), the printer 10 sends the error notification to the mobile terminal 100 without shifting the state of the printer from normal mode to sending mode (T620). As a result, the error screen is displayed in the mobile terminal 100. Thereby, even when an NFC connection has been established between the printer 10 and a mobile terminal operated by a third party who does not know the correct password P, it is possible to prevent NFC information from being sent from the printer 10 to that mobile terminal.

(Correspondence Relationship)

The password P, the normal mode, and the sending mode are examples of "a first password", "a first mode", and "a second mode", respectively.

Figure 13:
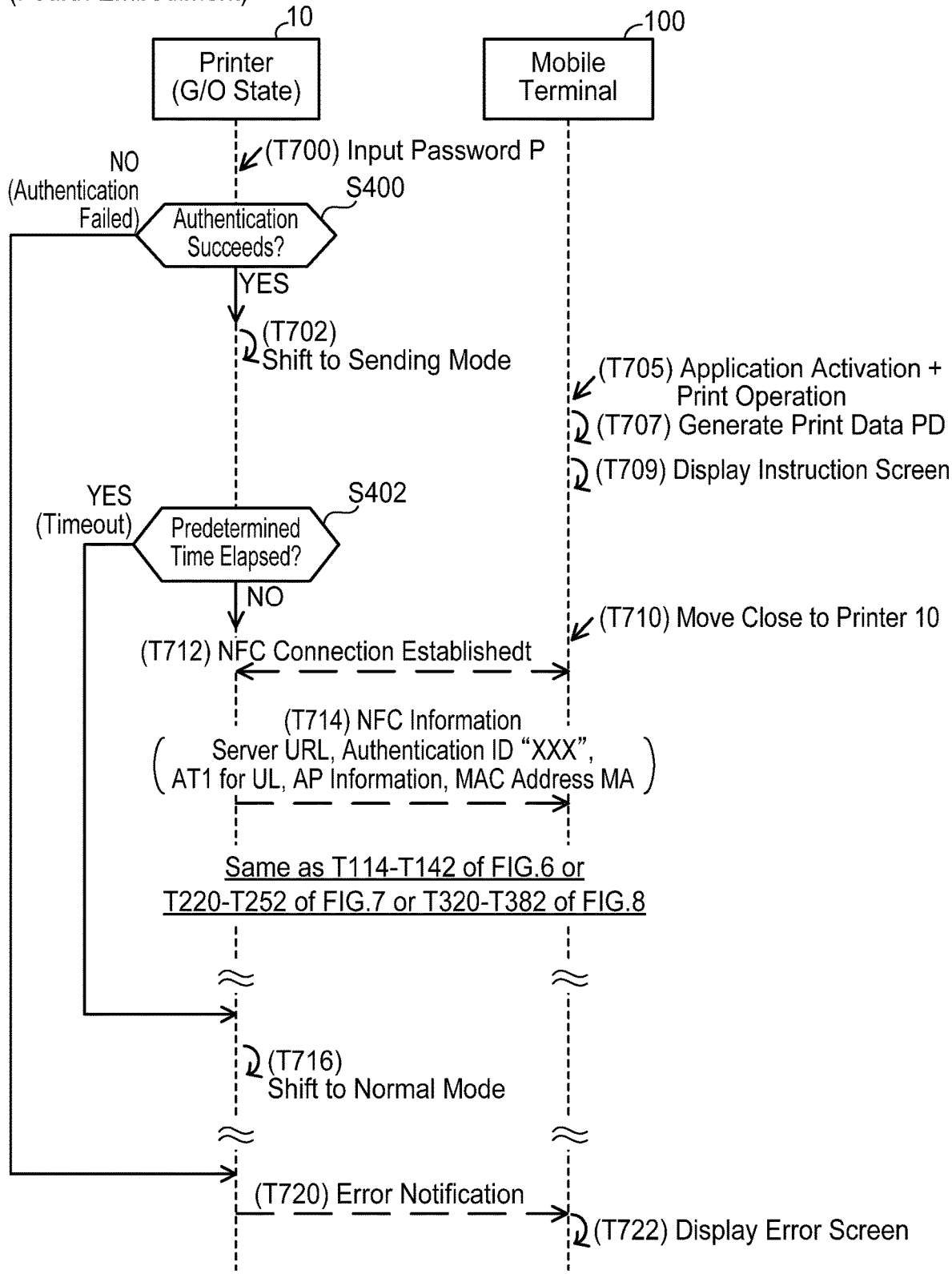
FIG. 13 shows a sequence diagram of a print process of a fourth embodiment.

Fourth Embodiment; FIG. 13

Next, a fourth embodiment will be described with reference to FIG. 13. The fourth embodiment is different from the third embodiment in a point that the password P is input to the printer 10 by the second user. In the fourth embodiment also, the password P has been stored in advance in the memory 34 of the printer 10. Further, in the initial state of FIG. 13, the printer 10 is operating in normal mode.

In T700, the printer 10 accepts the input of the password P from the second user. In this case, in S400 the printer 10 determines whether the password P being stored in the memory 34 and the password P input by the second user match. In case of determining that the two passwords P match (YES in S400), the printer 10 determines that authentication of the password P has succeeded, and in T702 changes the state of the printer 10 from normal mode to sending mode. On the other hand, in case of determining that the two passwords P do not match (NO in S400), the printer 10 determines that authentication of the password P has failed, and in T720 sends the error notification to the mobile terminal 100 via the NFC I/F 18. T722 is the same as T622 of FIG. 12.

T705 to T709 are the same as T100 to T104 of FIG. 6. In S402, the printer 10 determines whether a predetermined time has elapsed since the printer 10 has shifted to sending mode. In a case where the predetermined time has elapsed since the printer 10 has shifted to sending mode (YES in S402), in T716 the printer 10 shifts from sending mode to normal mode. On the other hand, in a case where the mobile terminal 100 is brought close to the printer 10 in T710 and an NFC connection with the mobile terminal 100 is established in T712 before the predetermined time since the printer 10 has shifted to sending mode has elapsed, in T714 the printer 10 sends the NFC information to the mobile terminal 100 via the NFC I/F 18. Thereafter, the same processes as T114 to T142 of FIG. 6, or T220 to T252 of FIG. 7, or T320 to T382 of FIG. 8 are executed, and the processes of FIG. 13 end.

Effect of Present Embodiment

In the present embodiment, in the case where the predetermined time has elapsed since the printer 10 has shifted from normal mode to sending mode (YES in S402), the printer 10 shifts from sending mode to normal mode (T716). Thereby, in a situation where an NFC connection is not established between the printer 10 and the mobile terminal 100, it is possible to prevent the printer 10 from operating in sending mode over a long period of time. The processing load of the printer 10 can be reduced.

Fifth Embodiment; FIG. 14

Next, a fifth embodiment will be described with reference to FIG. 14. The fifth embodiment is different from the first embodiment in a point that the NFC information sent from the printer 10 includes a public key PK. In FIG. 14, first, the same processes as T3 to T40 of FIG. 3 are executed.

In T800, the printer 10 generates the public key PK and a secret key SK, and stores the public key PK and the secret key SK in the memory 34.

In T802, the printer 10 supplies NFC information to the NFC I/F 18. The NFC information includes the generated public key PK in addition to the server URL, the authentication ID "XXX", the AT1 for UL, the AP information 38, and the MAC address MA.

T805 to T814 are the same as T100 to T114 of FIG. 7 excepting for the point that the NFC information includes the public key PK. In case of receiving the NFC information from the printer 10 via the NFC I/F 118 in T814, in T816 the mobile terminal 100 generates the print data PD by using the public key PK included in the NFC information to encrypt the image data selected by the second user in T805. T820 to T834 are the same as T220 to T234 of FIG. 7.

In case of receiving a print job from the server 200 via the Wi-Fi I/F 16 in T834, in T835 the printer 10 uses the secret key SK being stored in the memory 34 to decrypt the print data PD included in the print job to obtain image data, and in T836 executes printing of an image represented by the image data. Thereafter, the same processes as T130 to T142 of FIG. 6 are executed, and the processes of FIG. 14 end.

Effect of Present Embodiment

In a situation where the account information of the first user has been registered in the server 200, by logging into the server 200 using a PC or the like for example, the first user can view an image represented by the print data in the job information registered in the server 200. That is, the first user can view an image represented by the print data PD uploaded onto the server 200 by the second user. In the present embodiment, the printer 10 generates the public key PK and the secret key SK (T800), and sends the NFC information including the public key PK to the mobile terminal 100 (T814). Thereby, the mobile terminal 100 can generate the print data PD by encrypting the image data by using the public key PK included in the NFC information (T816), and send the job registration request including the generated print data PD to the server 200 (T820). That is, the mobile terminal 100 can upload, onto the server 200, the print data PD encrypted using the public key PK. Thereby, even if the first user logs into the server 200 and views the image represented by the print data PD, the first user cannot recognize what the image being represented by the print data PD is like. Further, in case of receiving the print job from the server 200 (T834), the printer 10 can obtain the image data by decrypting the print data PD by using the secret key SK (T835), and execute printing of the image represented by the image data (T836).

(Variant 1) The printer 10 may execute the processes of T30 to T42 of FIG. 3 in response to the establishment of the NFC connection with the mobile terminal 100. That is, "in a case where account information for logging in to a server is sent to the server, receive communication information from the server via the second type interface" of the "printer" may comprise receiving the communication information from the server after a first wireless connection with the terminal device has been established, and "supply the communication information to the first type interface in a case where the communication information is received from the server" of the "printer" may comprise supplying the communication information to the first type interface after the first wireless connection with the terminal device has been established.

(Variant 2) The printer 10 may not generate the authentication ID "XXX" in T40 of FIG. 3, and in T42 may supply NFC information not including the authentication ID "XXX" to the NFC I/F 18. In this case, in S103 (or S110), the printer 10 receives a print job including the print data and not including the authentication ID from the mobile terminal 100 (or the server 200), skips the process of S115, and in S120 executes printing of an image represented by the print data included in the print job. In the present variant, "supply first authentication information to the first type interface in the case where the communication information is received from the server, wherein the first authentication information is sent to the terminal device by using the first wireless connection with the terminal device", "receive second authentication information from the server via the second type interface in a case where the first authentication information is sent to the server due to the terminal device using the communication information without sending the account information to the server after the first authentication information has been sent to the terminal device", "determine whether the first authentication information matches the second authentication information in a case where the second authentication information is received from the server" of the "printer" can be omitted.

(Variant 3) The processes of S125 to S140 of FIG. 5 may be omitted. In the present variant, "receive a refresh token from the server via the second type interface in the case where the account information is sent to the server", "send an update request to the server via the second type interface in a case where the printing of the target image is executed by the print executing unit, the update request being for requesting an update of the communication information which is the access token, and the update request including the refresh token", "receive new communication information from the server via the second type interface in a case where the update request is sent to the server", "supply the new communication information to the first type interface in a case where the new communication information is received from the server" of the "printer" can be omitted.

(Variant 4) In the aforementioned embodiments, the mobile terminal 100 executed communications with the server 200 via the mobile I/F 120. However, in a situation where the mobile terminal 100 is connected to an AP for example, the mobile terminal 100 may execute communications with the server 200 via the Wi-Fi I/F 116 by using the AP.

(Variant 5) In T30 of FIG. 3, the printer 10 may send a token for UL request not including the account information AI to the server 200. In this case, the server 200 sends input screen data representing an input screen for inputting the account information to a PC of the first user for example. In case of receiving the input screen data from the server 200, the PC displays the input screen, and sends the account information AI to the server 200 in response to the input of the account information AI on the input screen. In case of receiving the account information AI from the PC, the server 200 determines that the account information AI has been registered (i.e., determines that authentication of the account information AI has succeeded), and sends a token for UL to the printer 10. That is, "account information" may not be sent from the printer to the server.

(Variant 6) The printer 10 may comprise, instead of the NFC I/F 18, for example, a BT I/F for executing a wireless communication according to the Bluetooth (registered trademark, referred to as "BT" below) scheme. In this case, the mobile terminal 100 also comprises a BT I/F instead of the NFC I/F 118. That is, each "first type interface" of the "printer" and the "terminal device" may be an interface configured to execute a wireless communication according to a scheme different from NFC.

(Variant 7) In the aforementioned embodiments, each process of FIG. 3 to FIG. 14 is realized by software (i.e., the program 36, the app 138). However, at least one of these processes may be realized by hardware such as a logic circuit.

What is claimed is:

1. A printer comprising:
    a first type interface;
    a second type interface different from the first type interface;
    a print executing unit;
    a processor; and
    a memory storing computer-readable instructions therein, the computer-readable instructions, when executed by the processor, causing the printer to:
        in a case where account information for logging in to a server is sent to the server, receive communication information from the server via the second type interface, the communication information being associated with the account information and being for uploading print data onto the server, the print data representing a target image to be printed;
        supply the communication information associated with the account information to the first type interface in a case where the communication information associated with the account information is received from the server, wherein the communication information associated with the account information is sent to a terminal device by using a first wireless connection with the terminal device via the first type interface;
        receive the print data from the server via the second type interface in a case where the print data is uploaded onto the server due to the terminal device using the communication information associated with the account information without sending the account information to the server after the communication information associated with the account information has been sent to the terminal device; and
        cause the print executing unit to print the target image represented by the print data in a case where the print data is received from the server.

2. The printer as in claim 1, wherein
    in the case where the account information is sent to the server, the communication information associated with the account information is received from the server via the second type interface before the first wireless connection with the terminal device is established, and
    in the case where the communication information associated with the account information is received from the server, the communication information associated with the account information is supplied to the first type interface before the first wireless connection with the terminal device is established.

3. The printer as in claim 1, wherein
    the computer-readable instructions, when executed by the processor, further cause the printer to:
        supply first authentication information to the first type interface in the case where the communication information associated with the account information is received from the server, wherein the first authentication information is sent to the terminal device by using the first wireless connection with the terminal device;
        receive second authentication information from the server via the second type interface in a case where the first authentication information is sent to the server due to the terminal device using the communication information associated with the account information without sending the account information to the server after the first authentication information has been sent to the terminal device; and
        determine whether the first authentication information matches the second authentication information in a case where the second authentication information is received from the server,
    wherein in a case where the print data is received from the server and it is determined that the first authentication information matches the second authentication information, printing of the target image is executed by the print executing unit, and in a case where it is determined that the first authentication information does not match the second authentication information, printing of the target image is not executed.

4. The printer as in claim 1, wherein the communication information associated with the account information is an access token for uploading the print data onto the server.

5. The printer as in claim 4, wherein
the computer-readable instructions, when executed by the processor, further cause the printer to:
receive a refresh token from the server via the second type interface in the case where the account information is sent to the server;
send an update request to the server via the second type interface in a case where the printing of the target image is executed by the print executing unit, the update request being for requesting an update of the communication information associated with the account information which is the access token, and the update request including the refresh token;
receive new communication information associated with the account information from the server via the second type interface in a case where the update request is sent to the server; and
supply the new communication information associated with the account information to the first type interface in a case where the new communication information associated with the account information is received from the server.

6. The printer as in claim 1, wherein
the memory stores a first password,
the computer-readable instructions, when executed by the processor, further cause the printer to:
accept an input of a second password;
determine whether the first password stored in the memory matches the second password in a case where the input of the second password is accepted; and
shift a state of the printer from a first mode to a second mode in a case where it is determined that the first password matches the second password, the first mode being a mode in which the first type interface is incapable of sending the communication information associated with the account information, and the second mode being a mode in which the first type interface is capable of sending the communication information associated with the account information.

7. The printer as in claim 1, wherein
the memory stores a public key and a secret key,
the computer-readable instructions, when executed by the processor, further cause the printer to:
supply the public key stored in the memory to the first type interface in the case where the communication information associated with the account information is received from the server, wherein the public key is sent to the terminal device by using the first wireless connection with the terminal device and the print data is generated in the terminal device by encrypting image data representing the target image by using the public key,
wherein in the case where the print data is received from the server, the image data is acquired by decrypting the print data by using the secret key stored in the memory and printing of the target image represented by the acquired image data is executed by the print executing unit.

8. The printer as in claim 1, wherein the first type interface is an interface for executing wireless communication according to a Near Field Communication (NFC) scheme.

9. The printer as in claim 1, wherein
in the case where the communication information associated with the account information is received from the server, the communication information associated with the account information is supplied to the first type interface, wherein the account information is not supplied to the first type interface.

10. A non-transitory computer-readable recording medium storing computer-readable instructions for a terminal device,
wherein the computer-readable instructions, when executed by a processor of the terminal device, cause the terminal device to:
in a case where a first wireless connection with a printer via a first type interface of the terminal device is established, receive communication information from the printer via the first type interface by using the first wireless connection, the communication information being associated with the account information and being for uploading print data onto a server, the print data representing a target image to be printed; and
in a case where the communication information associated with the account information is received from the printer, upload the print data onto the server by using the communication information associated with the account information without sending account information to the server, the account information being for logging in to the server,
wherein, in the server, the print data is sent to the printer in a case where the print data is received from the terminal device, and
in the printer, printing of the target image represented by the print data is executed in a case where the print data is received from the server.

11. The non-transitory computer-readable recording medium as in claim 10, wherein
the computer-readable instructions, when executed by the processor, further cause the terminal device to:
receive access point information from the printer via the first type interface by using the first wireless connection in the case where the first wireless connection with the printer is established, the access point information being for identifying an access point to which the printer is currently connected;
determine whether the access point information is stored in a memory of the terminal device in a case where the access point information is received from the printer; and
in a case where it is determined that the access point information is stored in the memory, send the print data to the printer via the access point identified by the access point information,
wherein in a case where the communication information associated with the account information is received from the printer and it is determined that the access point information is not stored in the memory, the print data is uploaded onto the server by using the communication information associated with the account information without sending the account information to the server.

12. The non-transitory computer-readable recording medium as in claim 10, wherein
the computer-readable instructions, when executed by the processor, further cause the terminal device to:
receive connection information from the printer via the first type interface by using the first wireless connection in the case where the first wireless connection with the printer is established, the connection information being for establishing a second wireless connection with the printer via a second type interface of the terminal device, and the second type interface being different from the first type interface;
determine whether communication with the server is executable in the case where the communication information associated with the account information is received from the printer;
in a case where it is determined that the communication with the server is inexecutable, establish the second wireless connection with the printer by using the connection information; and
send the print data to the printer via the second type interface by using the second wireless connection in a case where the second wireless connection with the printer is established,
wherein in a case where it is determined that the communication with the server is executable, the print data is uploaded onto the server by using the communication information associated with the account information without sending the account information to the server.

13. The non-transitory computer-readable recording medium as in claim 10, wherein
the computer-readable instructions, when executed by the processor, further cause the terminal device to:
accept an input of a target print setting which is a print setting to be used for printing the target image;
send a capability information request to the server in the case where the communication information associated with the account information is received from the printer, the capability information request being for requesting sending of capability information of the printer registered in the server, the capability information indicating a plurality of print settings available to the printer;
receive the capability information from the server in a case where the capability information request is sent to the server; and
determine whether the target print setting is included in the plurality of print settings indicated by the capability information in a case where the capability information is received from the server,
wherein in a case where it is determined that the target print setting is included in the plurality of print settings, the print data is uploaded onto the server by using the communication information associated with the account information without sending the account information to the server, and
in a case where it is determined that the target print setting is not included in the plurality of print settings, the print data is not uploaded onto the server.

14. The non-transitory computer-readable recording medium as in claim 10, wherein
the computer-readable instructions, when executed by the processor, further cause the terminal device to:
receive a public key from the printer via the first type interface by using the first wireless connection in the case where the first wireless connection with the printer is established; and
generate the print data by encrypting image data representing the target image by using the public key in a case where the public key is received from the printer, wherein in the case where the communication information associated with the account information is received from the printer, the generated print data is sent to the server by using the communication information associated with the account information without sending the account information to the server.

15. The non-transitory computer-readable recording medium as in claim 10, wherein
the communication information associated with the account information is an access token for uploading the print data onto the server.

16. The non-transitory computer-readable recording medium as in claim 10, wherein
the first type interface is an interface for executing wireless communication according to a Near Field Communication (NFC) scheme.

17. The non-transitory computer-readable recording medium as in claim 10, wherein
in the case where the first wireless connection is established, the communication information associated with the account information is received from the printer via the first type interface by using the first wireless connection, wherein the account information is not received from the printer.

* * * * *